(12) United States Patent
Maeda et al.

(10) Patent No.: US 8,589,617 B2
(45) Date of Patent: Nov. 19, 2013

(54) WRITE ONCE RECORDING DEVICE

(75) Inventors: Takuji Maeda, Osaka (JP); Shinji Inoue, Osaka (JP); Hiroki Etoh, Osaka (JP); Masahiro Nakamura, Hyogo (JP); Makoto Ochi, Osaka (JP); Yukiko Okamoto, Osaka (JP); Masahiro Nakanishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 400 days.

(21) Appl. No.: 12/517,844

(22) PCT Filed: Dec. 10, 2007

(86) PCT No.: PCT/JP2007/073765
§ 371 (c)(1),
(2), (4) Date: Jun. 5, 2009

(87) PCT Pub. No.: WO2008/072590
PCT Pub. Date: Jun. 19, 2008

(65) Prior Publication Data
US 2011/0022807 A1    Jan. 27, 2011

(30) Foreign Application Priority Data
Dec. 15, 2006   (JP) ................................ 2006-337925

(51) Int. Cl.
*G06F 12/00* (2006.01)
(52) U.S. Cl.
USPC ........................... 711/103; 711/112; 711/170
(58) Field of Classification Search
None
See application file for complete search history.

(56) References Cited

U.S. PATENT DOCUMENTS

| | | | | |
|---|---|---|---|---|
| 6,138,203 | A * | 10/2000 | Inokuchi et al. | 711/103 |
| 7,752,412 | B2 * | 7/2010 | Tomlin et al. | 711/170 |
| 2004/0003191 | A1 | 1/2004 | Minne | |
| 2006/0044979 | A1 | 3/2006 | Kuraoka et al. | |
| 2007/0177491 | A1 | 8/2007 | Honda et al. | |
| 2008/0126905 | A1 | 5/2008 | Deguchi et al. | |
| 2008/0301204 | A1 * | 12/2008 | Chodacki et al. | 707/205 |

FOREIGN PATENT DOCUMENTS

| | | |
|---|---|---|
| JP | 2004-38961 | 2/2004 |
| JP | 2006-85859 | 3/2006 |
| WO | 97/17652 | 5/1997 |

OTHER PUBLICATIONS

English language Abstract of JP 2006-85859, Mar. 30, 2006.
Japan Office Action, dated Jul. 3, 2012.

* cited by examiner

*Primary Examiner* — Matthew Bradley
*Assistant Examiner* — Daniel Tsui
(74) *Attorney, Agent, or Firm* — Greenblum & Bernstein, P.L.C.

(57) ABSTRACT

An access device 1 internally includes a logical-physical empty capacity management part 16 for obtaining information of a remaining capacity on a write once memory from a write once recording device 2A. In addition, the write once recording device 2A internally includes a physical empty capacity management part 27 for managing a remaining capacity on the write once memory and notifying the access device of the capacity. Prior to recording of file data, the access device 1 can know an accurate remaining capacity of the write once recording device by: obtaining a remaining capacity of the write once memory from the write once recording device 2A; and comparing the capacity with a remaining capacity on an FAT to decide an actually-recordable remaining capacity for file data.

10 Claims, 21 Drawing Sheets

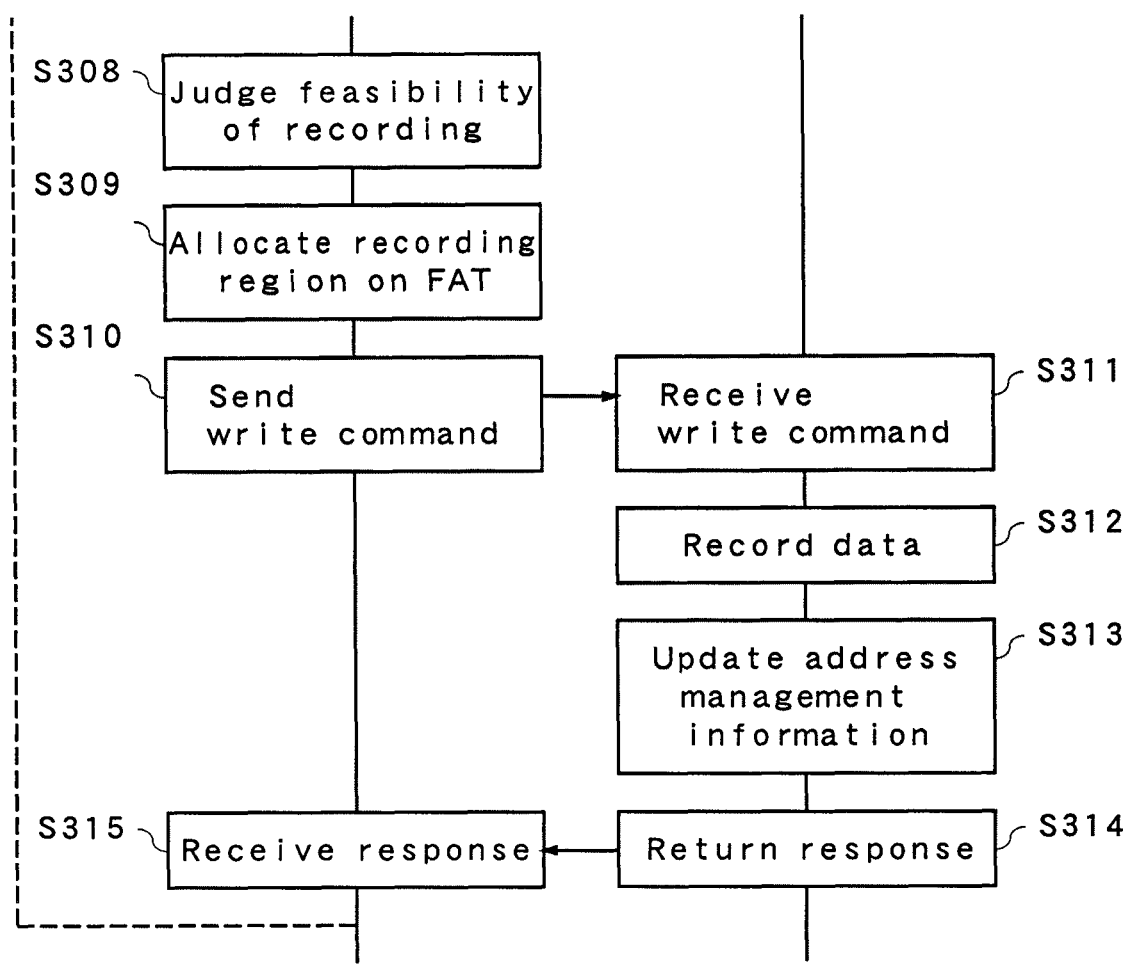
F I G. 1 0 B

F I G. 1 6 A
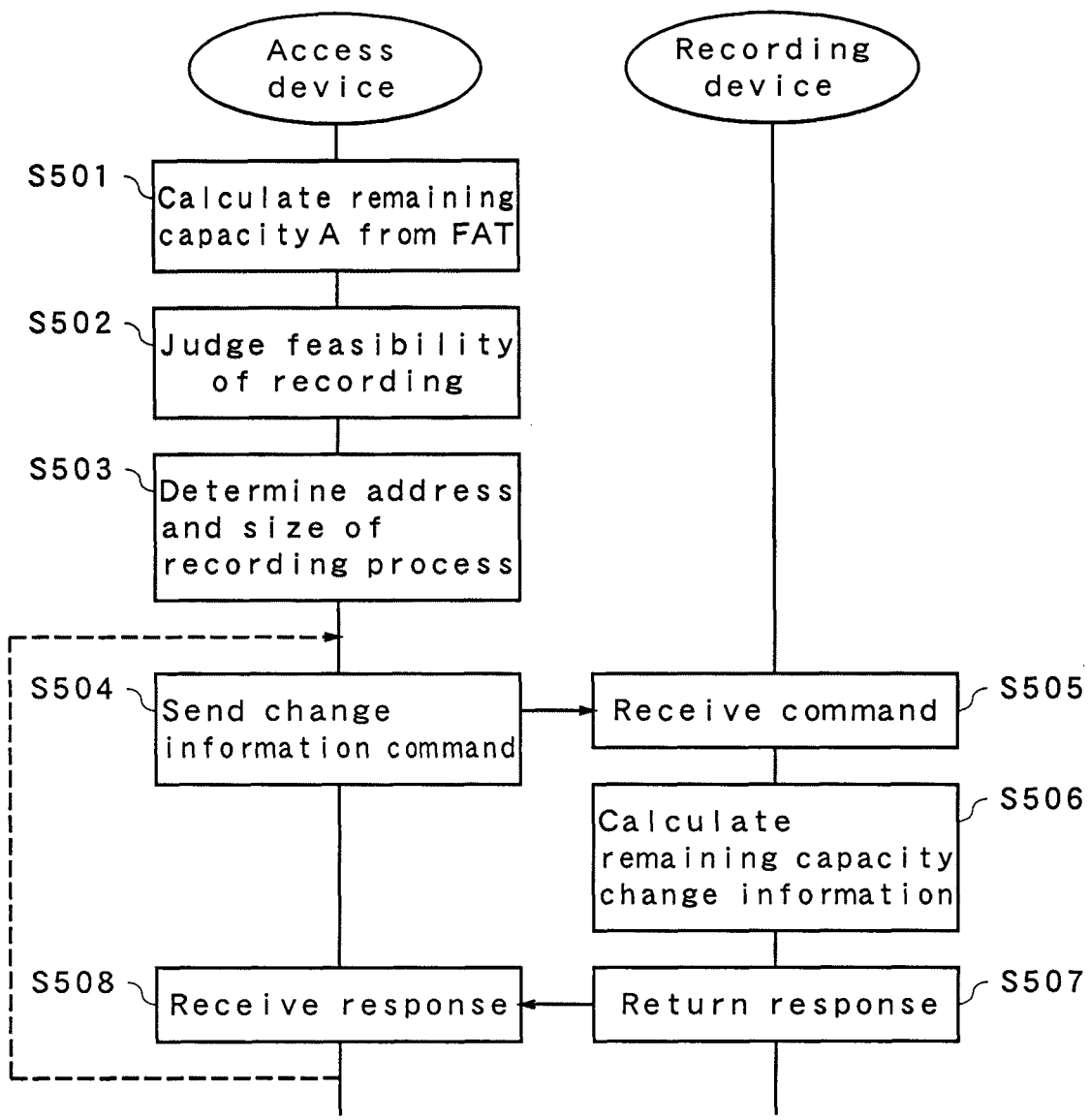

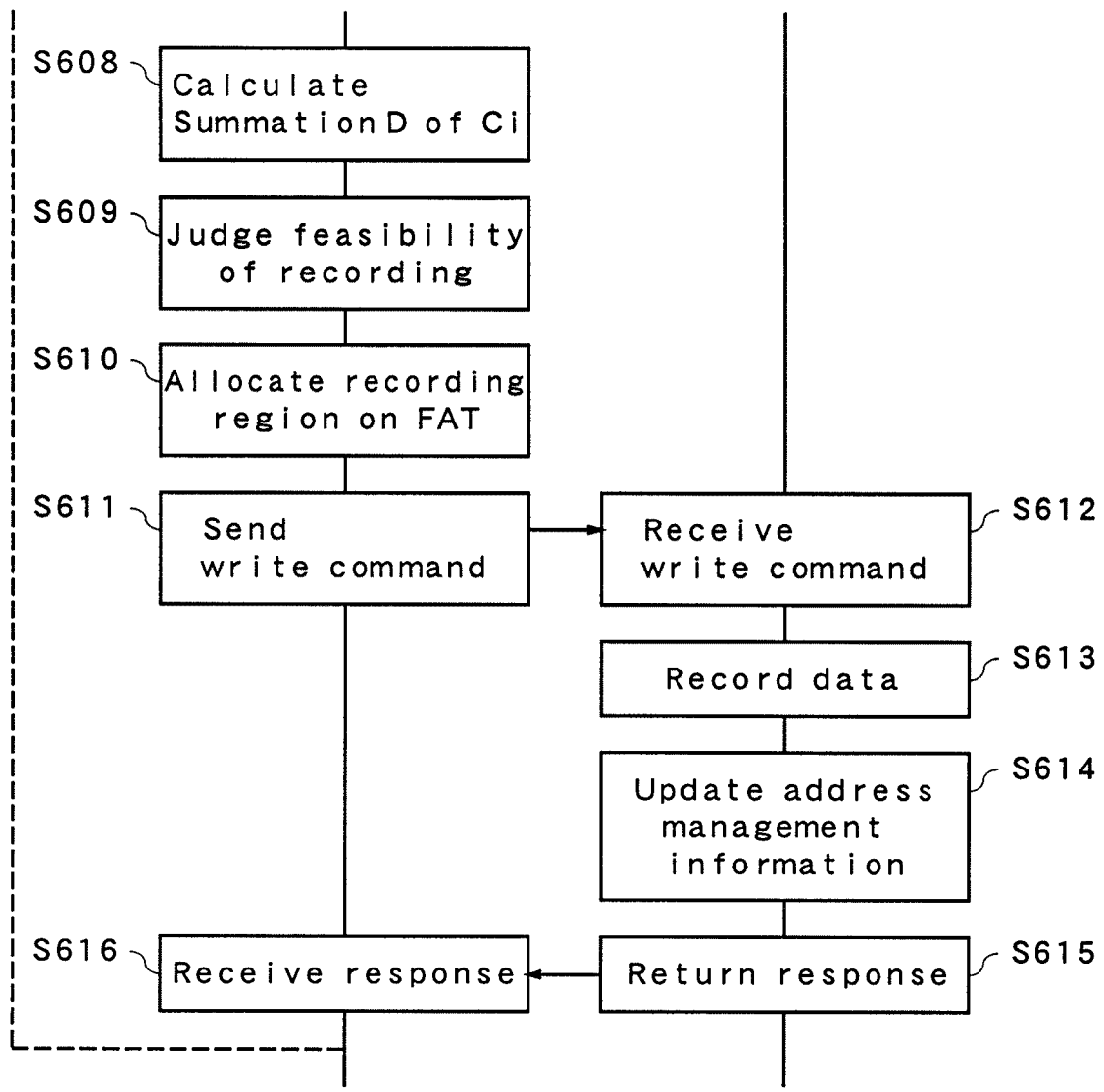
F I G. 1 9 B

WRITE ONCE RECORDING DEVICE

TECHNICAL FIELD

The present invention relates to a write once recording device, a controller, an access device, and a write once recording system where the access device is able to know an accurate remaining recordable capacity when data is recorded to the write once recording device employing a memory of a write once type able to record the data only once.

BACKGROUND ART

There are various types of recording media for recording digital data such as music contents and image data, the media, for example, a magnetic disk, an optical disk, and a magnetooptical disk. A memory card that is a type of the recording media mainly employs a semiconductor memory, for example, a flash ROM as a recording element, and rapidly spreads mainly in a small-size portable apparatus, for example, a digital still camera and a mobile phone terminal because the recording medium can be downsized.

In such memory card, a semiconductor element called a NAND type flash memory is mainly used as the recording element. The NAND type flash memory is a recording memory able to store, after preliminarily erasing already-stored data, other data again, and can constitute a memory card able to be rewritten more than once in a manner similar to a conventional hard disk.

Meanwhile, as a recording element different from the NAND type flash memory, an OTP (One Time Programmable) memory that can be manufactured in a low cost by applying a conventional technique of the COMS process has recently appeared and attracts attention. The OTP memory is a write once memory that restricts an identical physical memory region to be recorded only once. This memory may spread especially as a recording element of a memory card used for long-term storage of data as well as media such as the DVD-R because of a low manufacturing cost. Specifically, these recording elements can be used in accordance with user needs by preparing: a relatively high-priced memory card for sale employing the NAND type flash memory for a purpose requiring the rewriting many times as in the conventional memory card; and a relatively low-priced memory card for sale employing the OTP memory for a purpose not requiring the rewriting after recording data once.

In addition, data stored in the memory card is conventionally managed by a file system, and a user can easily handle the stored data as a file. For example, a FAT file system, a UDF file system (Universal Disk Format), and a NTFS file system (New Technology File System) exist as the conventionally used file system. Since being able to share a file with an apparatus able to interpret the same file system, the memory card that manages data by using the file system is able to receive and send data from and to the apparatus.

Here, the FAT file system will be described as one example of the conventional file system. FIG. 1 shows a logical address space, and a region retaining file system management information 100 exists at a starting position of the logical address space. The file system management information 100 is a region for storing management information of the file system, for example, an allocation unit of region and a size of the region managed by the file system. Management information of the file system called a master boot record and partition table 102, a partition boot sector 103, FATs (104 and 105), and a root directory entry 106 are included in the file system management information, and each include information required to manage a region of user data 101. The master boot record and partition table 102 is a region for storing information used for managing a region on the logical address space managed by the file system by dividing the region into a plurality of regions called a partition. The partition boot sector 103 is a region for storing management information for one partition. The FATS (104 and 105) are regions for storing information related to a storage position of data included in a file; the two FATs (104 and 105) having the same information generally exist in the memory card and are duplicated so that an file access can be ensured by using one of the FATs (104 and 105) even when the other one corrupts. The root directory entry 106 is a portion for storing: a file existing immediately below a root directory; and information of directory (directory entry).

In the FAT file system, a region for storing the user data 101 such as data of a file body exists following the region for retaining the file system management information 100. The user data 101 is divided and managed in management units called a cluster having a size of 16 kB or 32 kB, and each cluster stores data included in a file. A file storing lots of data stores the data striding over a plurality of clusters, links between the clusters are managed by link information stored in the FATs (104 and 105). In addition, a file existing in a directory immediately below a root directory and information of subdirectory (the directory entry) are stored by using a part of the user data 101.

Next, referring to FIG. 2 to FIG. 5, an example of writing of file data in the FAT file system will be explained. FIG. 2 is a view showing a configuration of the directory entry. FIG. 3 is a view showing a procedure of file data writing process. FIG. 4 is a view showing one example of a directory entry 107, the FATs (104 and 105), and the user data 101 before the writing. FIG. 5 is a view showing one example of the directory entry 107, the FATs (104 and 105), and the user data 101 after the writing.

As described above, in the FAT file system, the directory entry 107 storing information, for example, a file name, file size, and file attribution shown in FIG. 5(*a*) is stored in the root directory entry 106 and a part of the user data 101. As shown in FIG. 2, the directory entry 107 in the FAT file system is composed of 32 bytes and stores a file name, attributes, last update date and time, a starting cluster number, a file size, and so on.

Next, referring to FIG. 3, the procedure of the file data writing process will be explained.

(S101) The directory entry 107 of an object file is read.

(S102) The starting cluster number stored in the read directory entry 107 is obtained and a starting position of file data is confirmed.

(S103) A cluster number of a writing position is obtained by reading FATs (104 and 105) and following the links in turn from the starting position of file data obtained at S102 on the FATs (104 and 105).

(S104) It is judged whether or not it is required to allocate new empty region to the file in the data writing. The processing proceeds to S105 when the allocation of empty region is required. The processing proceeds to S106 when the allocation of empty region is not required.

(S105) The empty region on the FATs (104 and 105) is searched and the empty region of one cluster is allocated to a termination.

(S106) Data of the maximal size that can be written to the presently referred cluster to the user data 101 is written.

(S107) It is judged whether or not the writing of all data has been completed. The processing returns to S104 when data still remains. The processing proceeds to S108 when the writing of all data has been completed.

(S108) The file size, the last update date and time, and so on stored in the directory entry 107 are updated, and the directory entry 107 is overwritten.

(S109) The FATs (104 and 105) is overwritten and the processing is completed.

According to the processing of the file data writing, when data of 10000 bytes is further written to FILE1.TXT having data of 60000 bytes shown in FIG. 4, it changes to a file having data of 70000 bytes as shown in FIG. 5.

When storing file data, the FAT file system accordingly requires storing the directory entry 107, the FATs (104 and 105), and so on with the main data in a card. Since this information has to be overwritten for the same logical address in every updating, there is a problem that does not allow applying the above-mentioned FAT file system to the OTP memory that can record data only once.

As a conventional method for solving such problem, Patent document 1 proposes a method for realizing the overwriting in a pseudo manner by using a function to converting a logical address into a physical address in a storage medium using the OTP memory. This conventional method applies a function of conversion between a logical address and a physical address to realize the pseudo overwriting by newly allocating a part of a region ensured as a substitute region for a defective block at occurrence of the data overwriting and changing a data recording position on the basis of the address conversion.

Next, referring to FIG. 6, a conventional procedure of file data writing process applied to an information recording device that can rewrite data more than once will be explained.

(S201) An access device calculates a remaining capacity on the basis of the FATs (104 and 105) read from the information recording device into a RAM on the access device. Since a value of the FAT entry corresponding to an empty cluster is set to "0", the remaining capacity can be calculated by retrieving all FAT entries and counting the number of entries whose values are set to "0". In addition, reading of the FATS (104 and 105) is preliminarily completed, for example, immediately after attachment of the information recording device to the access device.

(S202) The access device judges based on the calculated remaining capacity whether or not file data can be stored. This judgment can be realized by comparing a size of the remaining capacity with a size of data written in a single file data recording. For example, when the file data writing is performed in units of clusters, the recording is judged to be possible in a case where the remaining capacity obtained at S201 has one cluster or more and is judged to be impossible in other case.

(S203) In the case where the recording is judged to be possible at S202, the access device searches an empty region with a data size written in a single file data recording on the FAT and allocates a recording region on the FAT by setting a FAT entry of the region to a value other than "0" on the RAM.

(S204) and (S205) The access device sends a command for writing the file data to the recording region allocated at S203. The information recording device receives the write command issued from the access device at S204.

(S206) The information recording device searches a recordable region on recording elements such as the NAND type flash memory and records the file data.

(S207) The information recording device updates address management information so that a physical address of the region where the file data was recorded at S206 can correspond to a logical address designated in the writing command by the access device at S204.

(S208) and (S209) As a response to the write command, the information recording device returns a recording completion response indicating completion of the recording to the access device, and the access device receives this response.

Then, while there is file data to be recorded, processes from S201 to S209 are repeated.

As described above, in the conventional procedure of the file data writing process, the remaining capacity is managed on the FAT, and the access device knows the remaining capacity by counting the number of empty clusters on the FAT.

Patent document 1: Japanese Unexamined Patent Publication No. 2006-85859

DISCLOSURE OF THE INVENTION

Problems to be Solved by the Invention

However, the above-mentioned conventional technique has following problems. In the conventional method, it is required to allocate new physical memory region in order to realize the pseudo overwriting to the OTP memory, and the physical memory region is consumed in each occurrence of the overwriting processing. Since the OTP memory can record data only once, the consumed region mentioned above cannot record data again and the remaining recordable capacity reduces in each occurrence of the overwriting processing. Since the reduction of this capacity is caused by the address conversion processing in a memory card, a file system control part on the access device side for accessing the memory card cannot know change of the capacity, resulting in inconsistency between a remaining recordable capacity recognized by the file system control part and a capacity actually recordable to the memory card. For this reason, the access device cannot know a remaining recordable capacity only by referring to the FAT. There has been a following problem; the OPT memory does not have an empty region to cause an error even though the file system control part sends a command for recording data after judging the recording is possible.

In addition, in a procedure of the file data writing process applied to a conventional write once recording device, since the pseudo overwriting is carried out to a write once memory, there is a following problem; a remaining recordable capacity is changed by the pseudo overwriting processing.

In view of the above-mentioned problems, the present invention intends to provide a write once recording device, a controller, an access device, and a write once recording system which notify the file system control part on the access device side of an accurate remaining recordable empty capacity in a case of realizing the pseudo overwriting to the OTP memory.

Means to Solve the Problems

To solve the problems, a controller according to the present invention: which is connected to a write once memory allowing data writing only once; to which a logical address designated by an external access device in accessing the write once memory is given; and which records and reads data on the basis of the logical address, comprises: an address conversion control part for: dividing said write once memory in units of fixed-length management units and managing the divided regions; retaining a correspondence relationship between a physical address and a logical address of each management unit and allocating an unrecorded region in said write once memory as a data recording region when a writing request is issued from said access device; and carrying out an address conversion process for relating said data recording region to a logical address designated by said access device; a physical empty capacity management part for judging a size of the unrecorded region in said write once memory and notifying said access device of the size as a remaining capacity physically-recordable by said access device; and a memory access part for writing data to said write once memory on the basis of a command from said access device and reading data from said write once memory.

Said memory access part may sequentially write data in ascending order of the physical address in said write once memory; and said address conversion control part may retain a correspondence relationship between said physical address and said logical address and treat data stored in a region of the biggest-numbered physical address as valid data stored in a region of the logical address in a case where the same logical address is related to a plurality of the physical addresses.

When the controller accepts a remaining capacity obtaining command issued by said access device prior to data recording, said physical empty capacity management part may calculate a size of unrecorded region in said write once memory on the basis of said address management information and notify said access device of the size as a remaining capacity physically-recordable by said access device.

After the controller accepts a remaining capacity obtaining command issued by said access device prior to data recording and said memory access part carried out a data writing process to said write once memory, said physical empty capacity management part may calculate a size of unrecorded region in said write once memory on the basis of said address management information and notify said access device of the size as a remaining capacity physically-recordable by said access device.

When the controller accepts a change information command issued by said access device prior to data recording, said physical empty capacity management part may: know information related to change of a remaining recordable capacity in said write once memory before and after carrying out a recording process designated by said access device on the basis of: said address management information and on information of an address and size related to the recording process designated with said command by the access device; and notify the access device of the information.

To solve the problems, a write once recording device according to the present invention comprises: a write once memory allowing data writing only once; and a controller which is connected to said write once memory; to which a logical address designated by an external access device in accessing the write once memory is given; and which records and reads data on the basis of the logical address, wherein said controller includes: an address conversion control part for: dividing said write once memory in units of fixed-length management units and managing the divided regions; retaining a correspondence relationship between a physical address and a logical address of each management unit and allocating an unrecorded region in said write once memory as a data recording region when a writing request is issued from said access device; and carrying out an address conversion process for relating said data recording region to a logical address designated by said access device; a physical empty capacity management part for judging a size of the unrecorded region in said write once memory and notifying said access device of the size as a remaining capacity physically-recordable by said access device; and a memory access part for writing data to said write once memory on the basis of a command from said access device and reading data from said write once memory.

Said memory access part may sequentially write data in ascending order of the physical address in said write once memory; and said address conversion control part may retain a correspondence relationship between said physical address and said logical address and treat data stored in a region of the biggest-numbered physical address as valid data stored in a region of the logical address in a case where the same logical address is related to a plurality of the physical addresses.

When the controller accepts a remaining capacity obtaining command issued by said access device prior to data recording, said physical empty capacity management part may calculate a size of unrecorded region in said write once memory on the basis of said address management information and notify said access device of the size as a remaining capacity physically-recordable by said access device.

After the controller accepts a remaining capacity obtaining command issued by said access device prior to data recording and said memory access part carried out a data writing process to said write once memory, said physical empty capacity management part may calculate a size of unrecorded region in said write once memory on the basis of said address management information and notify said access device of the size as a remaining capacity physically-recordable by said access device.

When the controller accepts a remaining capacity change obtaining command issued by said access device prior to data recording, said physical empty capacity management part may: know information related to change of a remaining recordable capacity in said write once memory before and after carrying out a recording process designated by said access device on the basis of: said address management information and on information of an address and size related to the recording process designated with said command by the access device; and notify the access device of the information.

To solve the problem, an access device according to the present invention which accesses a write once recording device having a write once memory allowing data writing only once, comprises: a file system control part for controlling data as a file on the basis of file system information constructed in a recording region in said write once recording device; and a logical-physical empty capacity management part for judging whether recording to said write once recording device is possible or not on the basis of: a remaining capacity logically-recordable to said write once recording device, the remaining capacity being obtained from region management information managed by said file system control part; and a physically-remaining recordable capacity obtained from said write once recording device.

Said logical-physical empty capacity management part may issue a remaining capacity obtaining command and obtain a remaining capacity physically-recordable to said write once recording device prior to data recording to said write once recording device.

Said logical-physical empty capacity management part may issue a writing command to said write once recording device and obtain a remaining capacity physically-recordable to said write once recording device as a response to the issuance.

Said logical-physical empty capacity management part may designate an address and size of a recording process and issue a change information command related to change of a remaining capacity prior to data recording to said write once recording device, and obtain a remaining capacity physically-recordable to said write once recording device as a response to the issuance.

To solve the problems, a write once recording system according to the present invention comprises: a write once recording device having a write once memory allowing data writing only once; and an access device for accessing said write once recording device, wherein: said write once recording device includes: a write once memory allowing data writing only once; and a controller which is connected to said write once memory; to which a logical address designated by an external access device in accessing the write once memory is given; and which records and reads data on the basis of the logical address; said controller includes: an address conversion control part for: dividing said write once memory in units of fixed-length management units and managing the divided regions; retaining a correspondence relationship between a physical address and a logical address of each management unit and allocating an unrecorded region in said write once memory as a data recording region when a writing request is issued from said access device; and carrying out an address conversion process for relating said data recording region to a logical address designated by said access device; a physical empty capacity management part for judging a size of the unrecorded region in said write once memory and notifying said access device of the size as a remaining capacity physically-recordable by said access device; and a memory access part for writing data to said write once memory on the basis of a command from said access device and reading data from said write once memory; and said access device includes: a file system control part for controlling data as a file on the basis of file system information constructed in a recording region in said write once recording device; and a logical-physical empty capacity management part for judging whether recording to said write once recording device is possible or not on the basis of: a remaining capacity logically-recordable to said write once recording device, the remaining capacity being obtained from region management information managed by said file system control part; and a physically-remaining recordable capacity obtained from said write once recording device.

Effectiveness of the Invention

According to the present invention, an access device can know an accurate remaining recordable empty capacity in a case of realizing the pseudo overwriting to a memory card having the OTP memory, and accordingly a following problem can be avoided; file data is recorded even though the memory card does not have an empty region.

BRIEF DESCRIPTION OF DRAWINGS

FIG. 10B is a flowchart showing the file data writing process to the write once recording device in embodiment 1 of the present invention.
FIG. 16A is a flowchart showing modified example 2 of the file data writing process to the write once recording device in embodiment 1 of the present invention.
FIG. 19B is a flowchart showing the file data writing process to the write once recording device in embodiment 2 of the present invention.

EXPLANATION FOR REFERENCE NUMERALS

Figure 1:
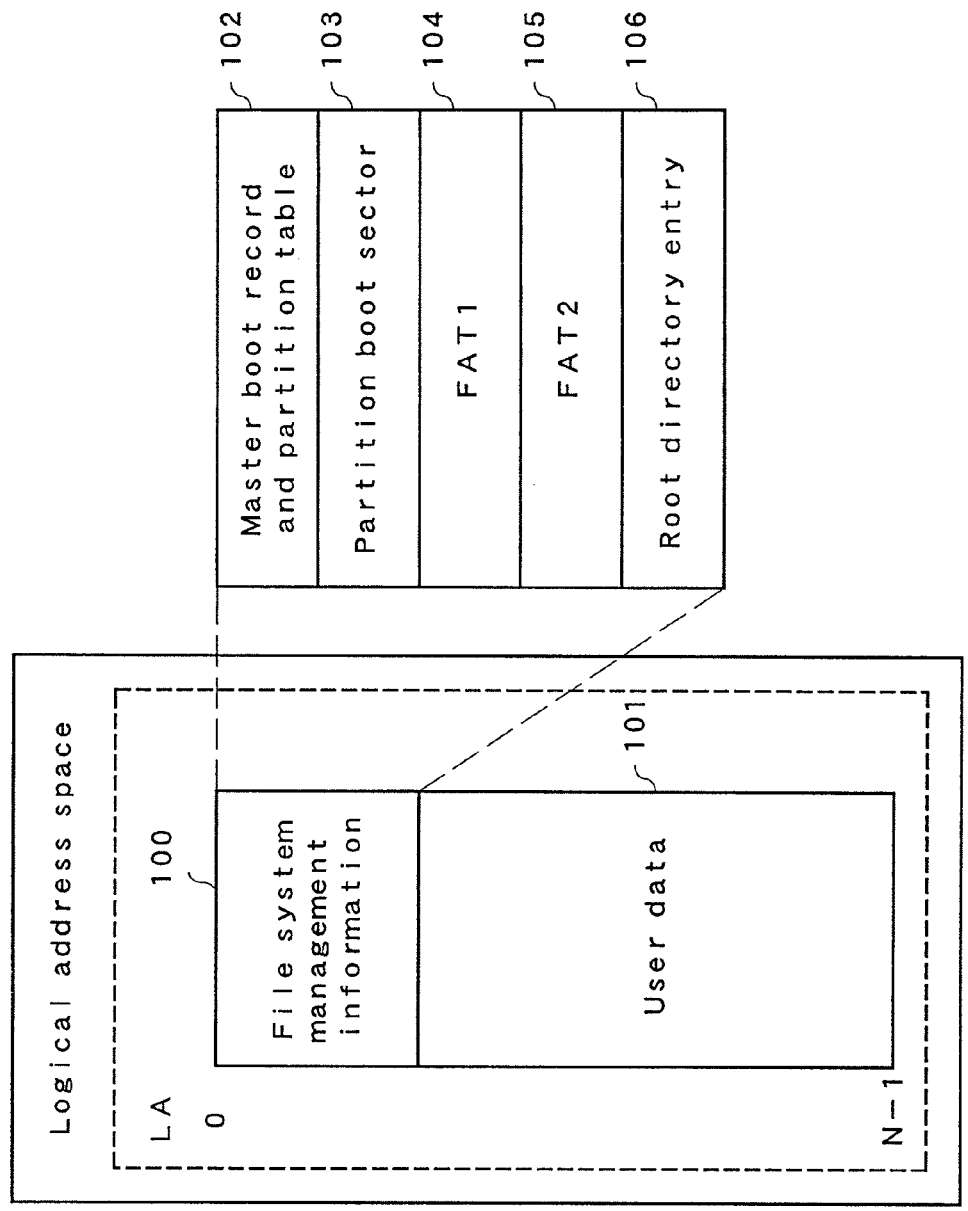
FIG. 1 is an explanation view showing a configuration of a FAT file system.
Figure 2:
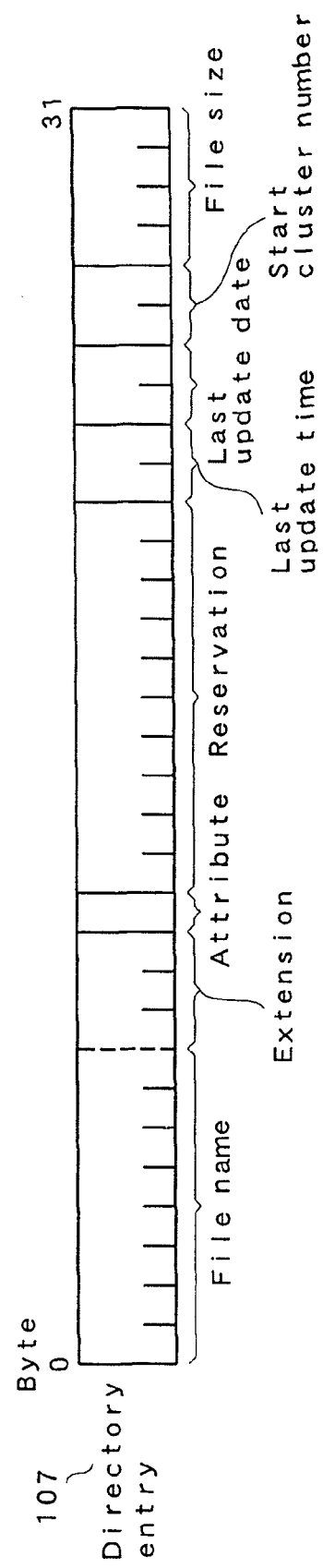
FIG. 2 is an explanation view showing a configuration of a directory entry.

1 Access device
2A, 2B Write once recording device
11, 22 CPU
12, 23 RAM
13 Recording device interface
14, 24 ROM
15 Application control part
16 Logical-physical empty capacity management part
17 File system control part
18 Recording device access part
21 Access device interface
25, 30-1, 30-2, . . . , 30-P Write once memory
26 Command interpretation part
27 Physical empty capacity management part
28 Address conversion control part
29 Memory access part
100 File system management information
101 User data
102 Master boot record and partition table
103 Partition boot sector
104, 105 FAT
106 Root directory entry
107 Directory entry

BEST MODE FOR CARRYING OUT THE INVENTION

Referring to drawings, a write once recording device, a controller, an access device, and a write once recording system according to the present invention will be explained below.

Embodiment 1

Figure 7:
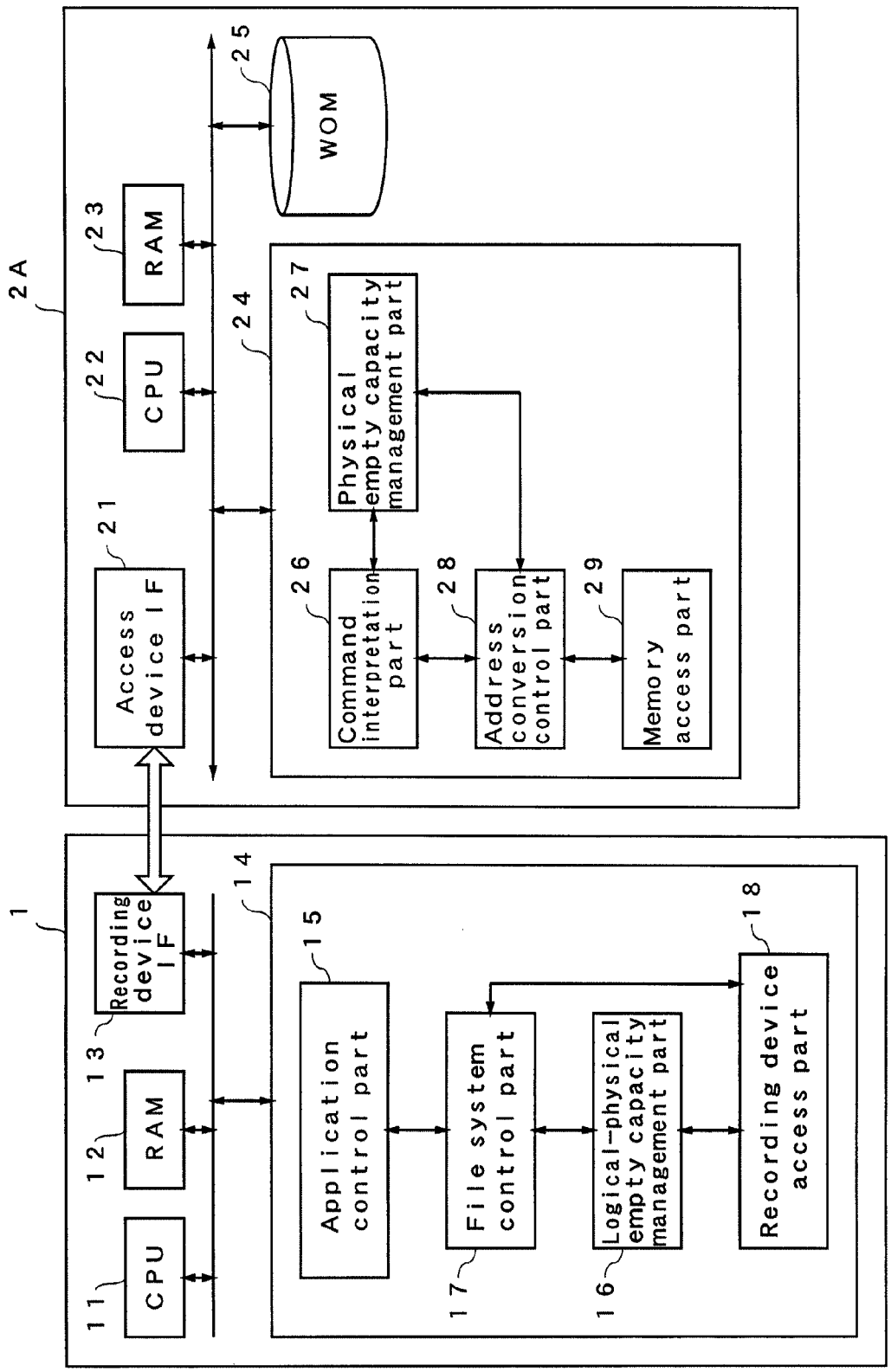
FIG. 7 is an explanation view showing an access device and a write once recording device in embodiment 1 of the present invention.

FIG. 7 is a configuration view of an access device 1 and a write once recording device 2A in embodiment 1 of the present invention. In FIG. 7, the access device 1 includes a CPU 11, a RAM 12, a recording device interface (recording device IF) 13, and a ROM 14. The recording device interface 13 is a connecting portion between the access device 1 and the write once recording device 2A, and is an interface for sending and receiving a control signal and data.

The ROM 14 stores a program for controlling the access device 1, and the program uses the RAM 12 as a temporal memory region and runs on the CPU 11. The ROM 14 includes an application control part 15, a logical-physical empty capacity management part 16, a file system control part 17, and a recording device access part 18.

The application control part 15 controls whole of the access device 1, for example, generation of data and control of power supply.

The logical-physical empty capacity management part 16 issues a remaining capacity obtaining command before data recording to the write once recording device. And, the logical-physical empty capacity management part 16 judges whether the recording to the write once recording device is possible or not on the basis of: a remaining capacity on a logical address space obtained from region management information managed by the file system control part 17; and a physically remaining recordable capacity obtained from the write once recording device 2A, and notifies the file system control part 17 of the judgment.

The file system control part 17 is the same as a file system control part mounted to a conventional access device, and carries out control for managing data as a file by using, for example, a FAT file system. When accessing the write once memory, the access device designates a logical address.

The recording device access part 18 controls sending and receiving data and a command to the write once recording device 2A, for example, the recording device access part 18 receives data, its size, and a logical address from the file system control part 17 and records the data of the designated size into a recording region of the write once recording device 2A.

Meanwhile, in FIG. 7, the write once recording device 2A includes a controller having: an access device interface (access device IF) 21; a CPU 22; a RAM 23; and a ROM 24, and a write once memory (WOM) 25.

The access device interface 21 is a connecting portion between the write once recording device 2A and the access device 1, and is an interface for sending and receiving a control signal and data in a similar manner to the recording device interface 13.

The write once memory (WOM) 25 is a memory allowing data writing to each region only once, and, for example, an OTP memory is employed. Data to be recorded to this memory includes file system management information, user data, address management information indicating a correspondence relationship between a logical address and a physical address, and the like.

The ROM 24 stores a program for controlling the write once recording device 2A, and the program uses the RAM 23 as a temporal memory region and runs on the CPU 22. The ROM 24 includes a command interpretation part 26, a physical empty capacity management part 27, an address conversion control part 28, and a write once memory access part 29.

The command interpretation part 26 interprets a command sent from the access device 1. The command includes a write command, a reading command, as well as a remaining capacity obtaining command for obtaining data of a remaining capacity and a changing information command for obtaining changing information of the remaining capacity.

The physical empty capacity management part 27 calculates and manages a remaining recordable capacity existing on the write once memory 25. In a case where the access device 1 issues the remaining capacity obtaining command, the physical empty capacity management part 27 notifies the access device 1 of a remaining capacity managed by the physical empty capacity management part 27 as a physically-remaining recordable capacity.

The address conversion control part 28 divides the write once memory in units of fixed-length management units and manages the divided regions, converts a logical address used in a communication with the access device 1 into a physical region of each management unit on the write once memory 25, and retains its correspondence relationship. In addition, when the access device issues a writing request, the address conversion control part 28 allocates an unrecorded region in the write once memory 25 as a data recording region, and carries out the address conversion processing for relating the data recording region to a logical address designated by the access device in the writing request. The address conversion control part 28 retains a correspondence relationship between a physical address and a logical address, and, in a case where the same logical address is related to a plurality of physical addresses, treats data stored in a region of the biggest-numbered physical address as valid data stored in a region of the logical address.

The memory access part 29 accesses the write once memory 25 on the basis of a physical address designated by the address conversion part 28, and writes and reads data. When writing data, the memory access part 29 sequentially writes data in ascending order of the physical address in the write once memory.

Figure 8:
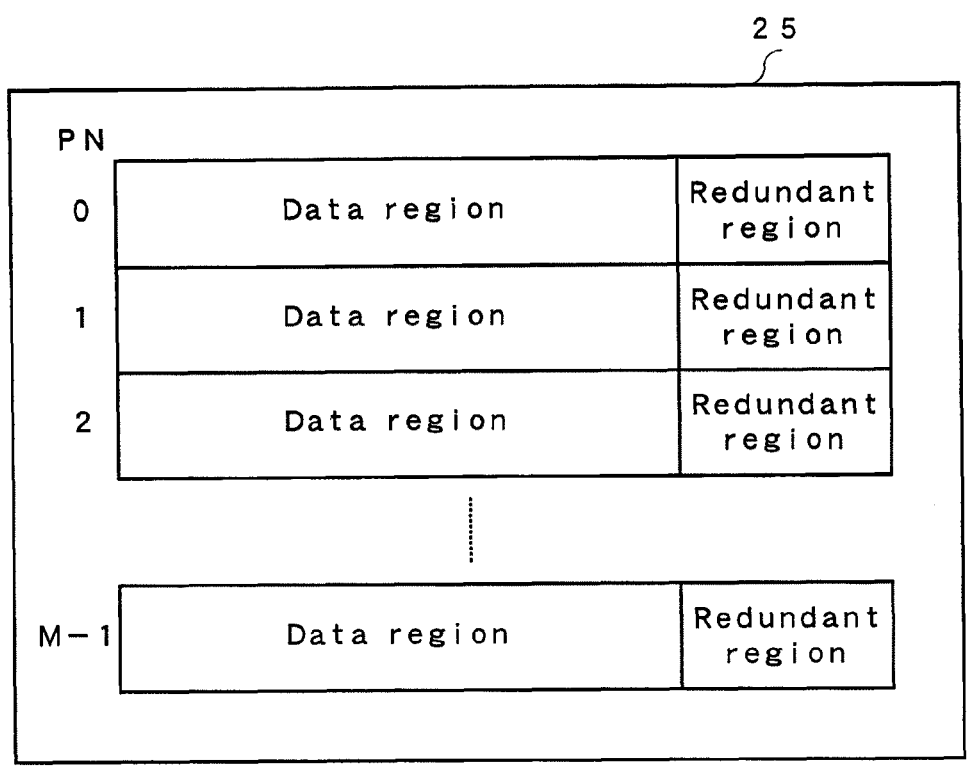
FIG. 8 is an explanation view showing a configuration of a write once memory in embodiment 1 of the present invention.

FIG. 8 is a view showing a whole configuration of the write once memory 25 in embodiment 1. The write once memory 25 is composed of a plurality of continuously-arranged pages, and is managed with allocating page numbers PN, 0 to M−1, to the respective pages as the physical address. Here, each page of the write once memory 25 is a management unit. Each page is composed of: a data region to which data can be written by the access device 1; and a redundant region used for a management region in the write once recording device 2A.

Figure 9:
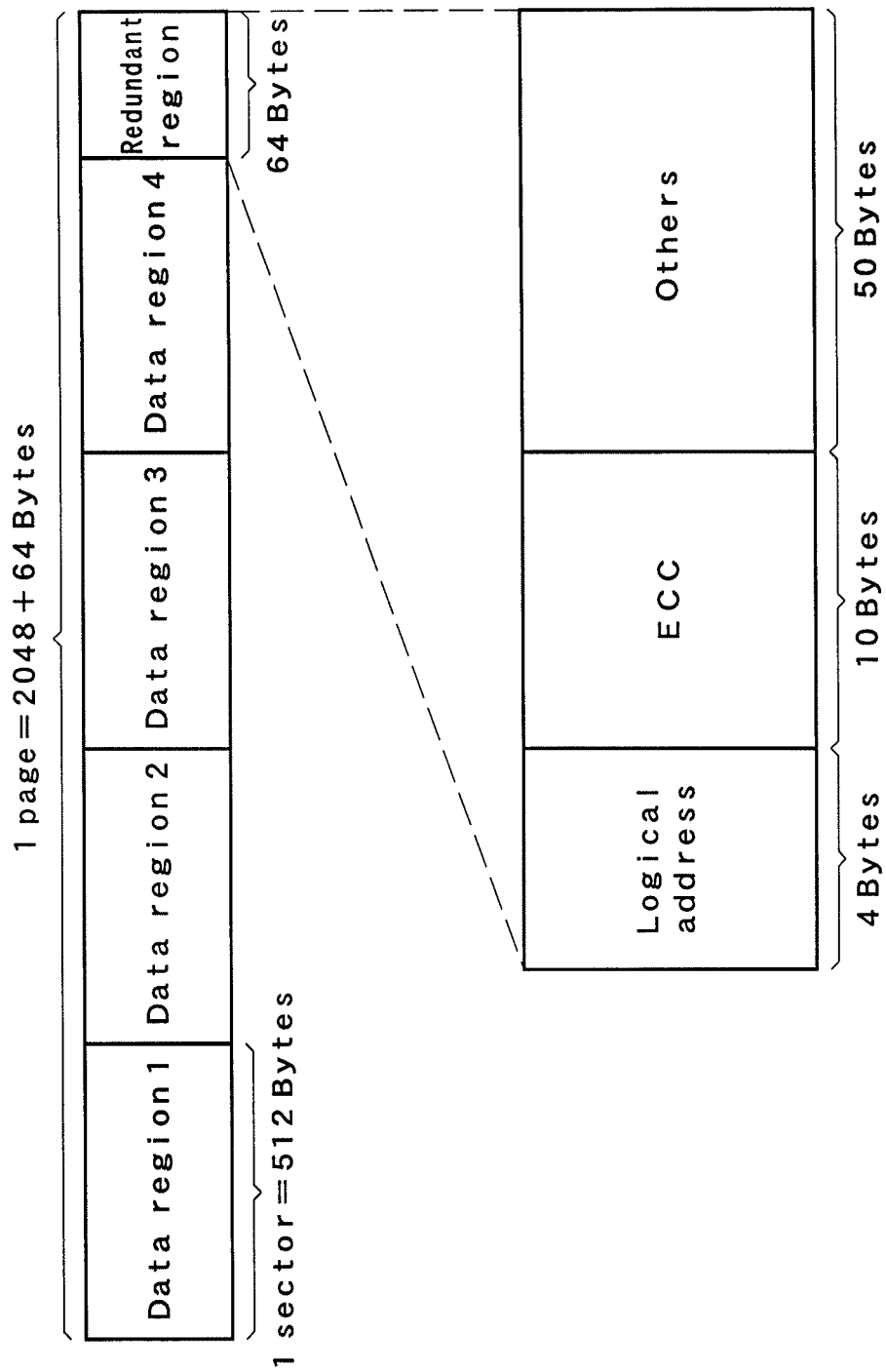
FIG. 9 is an explanation view showing one example of address management information in embodiment 1 of the present invention.

FIG. 9 is a view showing details of each page, and shows an example of managing the data region of 2048 bytes and the redundant region of 64 bytes as one recording unit (the page). The data region has data regions 1 to 4 each having a size of 512 bytes. The redundant region has: a region for storing information showing which logical address corresponds to a physical address of the page; and a region for storing ECC used for error correction in the data region. In embodiment 1, a case where a logical address as the address management information is stored in the redundant region in the write once memory 25 will be explained.

In the write once recording device 2A of the embodiment, the physical empty capacity management part 27 manages a remaining recordable capacity on the write once memory 25, and when the access device 1 orders data recording, the address conversion control part 28 updates the correspondence relationship between a logical address and a physical address after allocating new physical address and recording data and realizes pseudo overwriting processing and additional writing processing to the write once memory 25. Moreover, when the remaining capacity obtaining command has been issued from the access device 1, the address conversion control part 28 notifies the access device 1 of the remaining capacity managed by the physical empty capacity management part 27. In this manner, in a case where the access device 1 writes data to the write once recording device 2A, the access device 1 can know an accurate remaining recordable capacity, resulting in avoiding a problem of recording file data even though the write once recording device 2A has no empty region.

The write once recording device 2A may manage a total physical capacity of the write once memory 25 supposing that the size is the same size as a total capacity of a logical address space where the access device 1 can read and write data. In this case, a remaining capacity on the logical address space of the new write once memory 25 seen from the FAT is equal to a remaining capacity on a physical address space. In addition, the write once recording device 2A may manage a capacity obtained by subtracting a size of a region independently used for region management from the total physical capacity as a total capacity of the logical address space. In this case, the remaining capacity on the logical address space seen from the FAT is smaller than the remaining capacity on the physical address space in the new write once memory 25, the remaining capacity on the physical address space becomes smaller than the remaining capacity on the logical address space as the overwriting and the like are repeated.

Figure 10A:
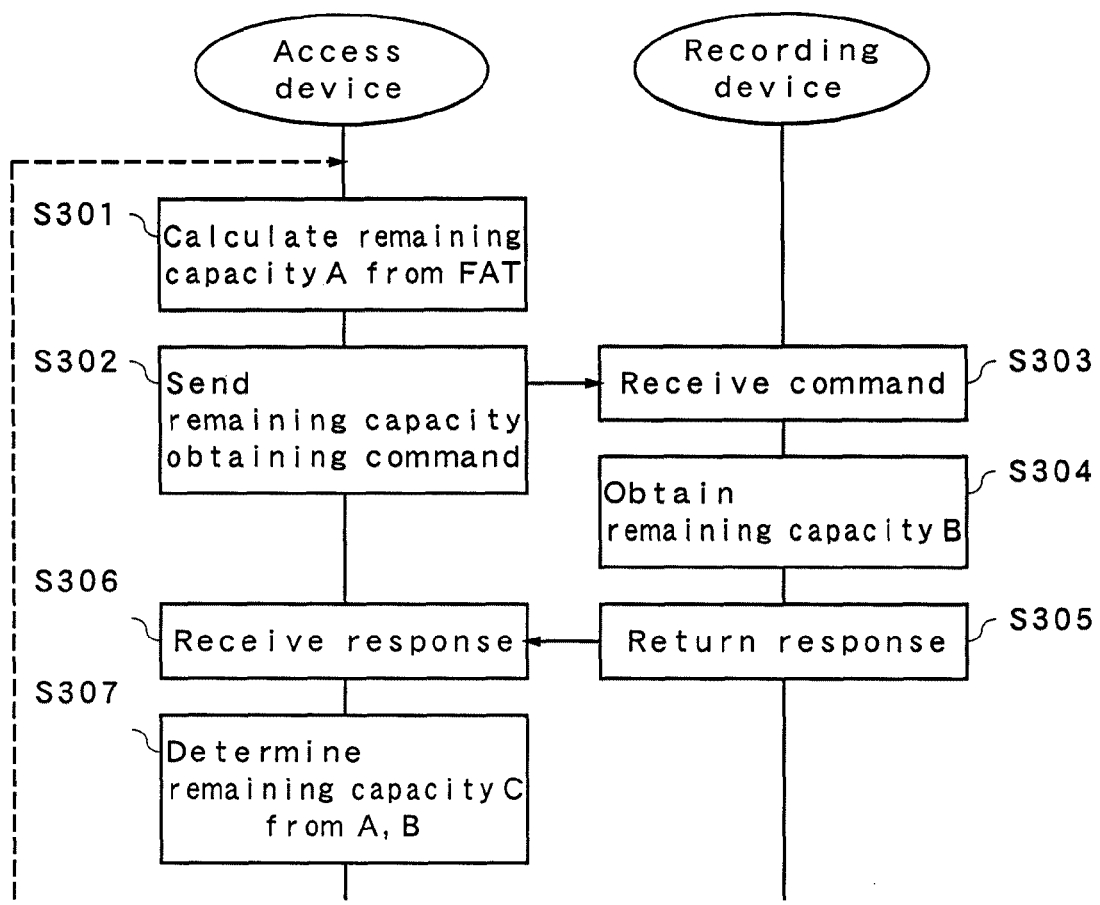
FIG. 10A is a flowchart showing a file data writing process to the write once recording device in embodiment 1 of the present invention.

Next, referring to FIG. 10A and FIG. 10B, the procedure of file data writing process to the write once recording device 2A in embodiment 1 will be explained.

(S301) The access device 1 calculates a remaining capacity A in the logical space on the basis of the FATs (104 and 105) read from the write once recording device 2A into the RAM 12 on the access device 1.

(S302) The access device 1 issues a command for obtaining a remaining capacity (hereinafter simply referred to as a remaining capacity obtaining command) to the write once recording device 2A. This command is for obtaining a remaining recordable capacity on the physical space from the write once memory 25 in the write once recording device 2A.

(S303) and (S304) The write once recording device 2A receives the remaining capacity obtaining command issued from the access device 1 at S302, identifies a type of the command by using the command interpretation part 26, and obtains the remaining capacity on the physical space from the physical empty capacity management part 27. Specifically, the recording device obtains a size of a physical capacity to which data has never been recorded on the write once memory 25 as the remaining capacity, for example.

(S305) The write once recording device 2A returns information, as a response to the remaining capacity obtaining command, of a remaining capacity B on the physical space obtained at S304 with a response notifying completion of a remaining capacity obtaining process to the access device 1.

(S306) and (S307) Upon reception of the response, the access device 1 determines a smaller value, the remaining capacity A calculated at S301 or the remaining capacity B obtained at S304, as an actually-remaining recordable capacity C.

(S308) The access device 1 judges based on the determined remaining capacity C whether the recording of file data is possible or not, and finish the processing if impossible.

(S309) In the case where the recording has been judged to be possible at S308, the access device 1 searches an empty region of a data size written in a single file data writing on the FATs (104 and 105) and allocates a recording region on the FATs (104 and 105) by setting the FAT entry to a value other than "0" on the RAM 12.

(S310) The access device 1 sends a write command to the write once recording device 2A in order to record file data to the recording region allocated at S309.

(S311) and (S312) When the write once recording device 2A has received the write command issued by the access device 1, the address conversion control part 28 searches a recordable region on the write once memory 25 and the memory access part 29 records the file data.

(S313) The recording device updates address management information so that a physical address of the region where the file data was recorded at 312 can correspond to the logical address designated by the write command from the access device 1.

(S314) and (S315) The write once recording device 2A returns a response notifying completion of the recording to the access device 1, and the access device 1 receives the response.

Then, while there is file data to be recorded, processes from S301 to S315 are repeated.

In this manner, when recording file data to the write once recording device 2A in embodiment 1 of the present invention, the access device 1 issues the remaining capacity obtaining command to the write once recording device 2A, and obtains a physically-remaining recordable capacity and then knows an actually-remaining recordable capacity with comparing the physically-remaining recordable capacity with the remaining capacity on the FATS (104 and 105). This enables the write once recording device 2A to know an accurate remaining capacity in a case of carrying out the pseudo overwriting to the write once memory 25.

Figure 11:
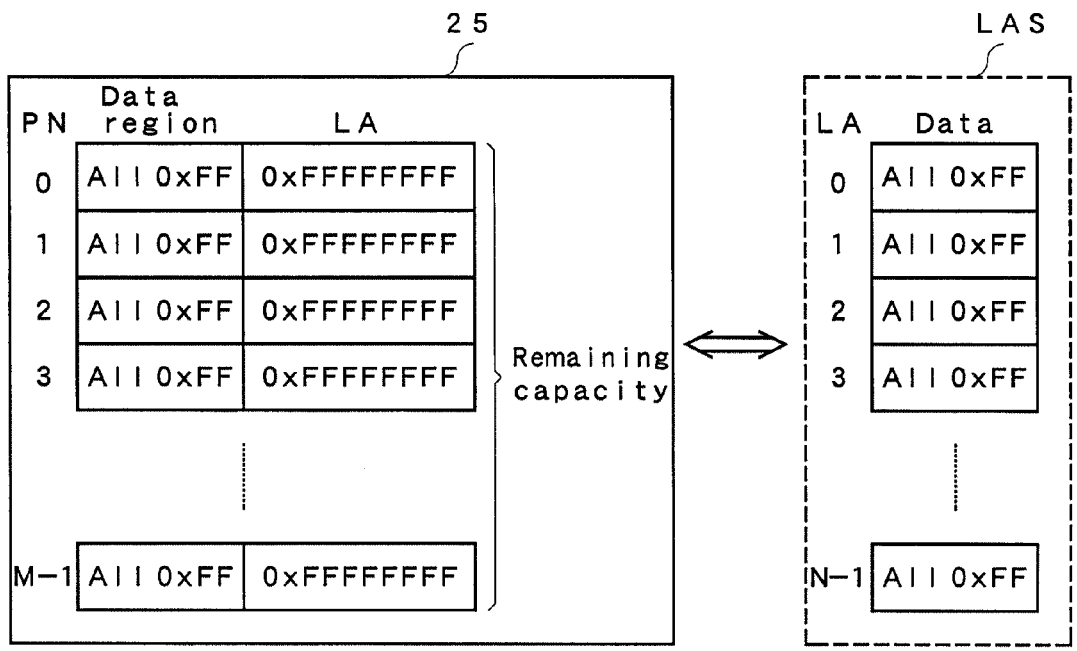
FIG. 11 is an explanation view showing a state (1) of the write once memory in embodiment 1 of the present invention.

Next, FIGS. 11 to 14 are views each showing change of retained information of the write once memory 25 and of the logical address space LAS corresponding thereto in the data recording. The logical address space LAS represented by a dashed line shows this logical address LA and data corresponding thereto. FIG. 11 shows a state where no data is recorded to the write once memory 25, all the data regions of page numbers PN 0 to PN (M−1) that are physical addresses in the write once memory 25 and all regions in the redundant regions for storing the logical address LA each have an initial value. Here, a case where 0xFF is set as the initial value of the data region is supposed. In addition, in a case where 0xFFFFFFFF is set to a region for storing a logical address, the case indicates the page is not allocated to any logical address. That is, since no page is allocated to all logical pages in the state of FIG. 11, the initial value (0xFF) is read when the access device 1 reads data stored in each logical address from the write once recording device 2A.

Figure 12:
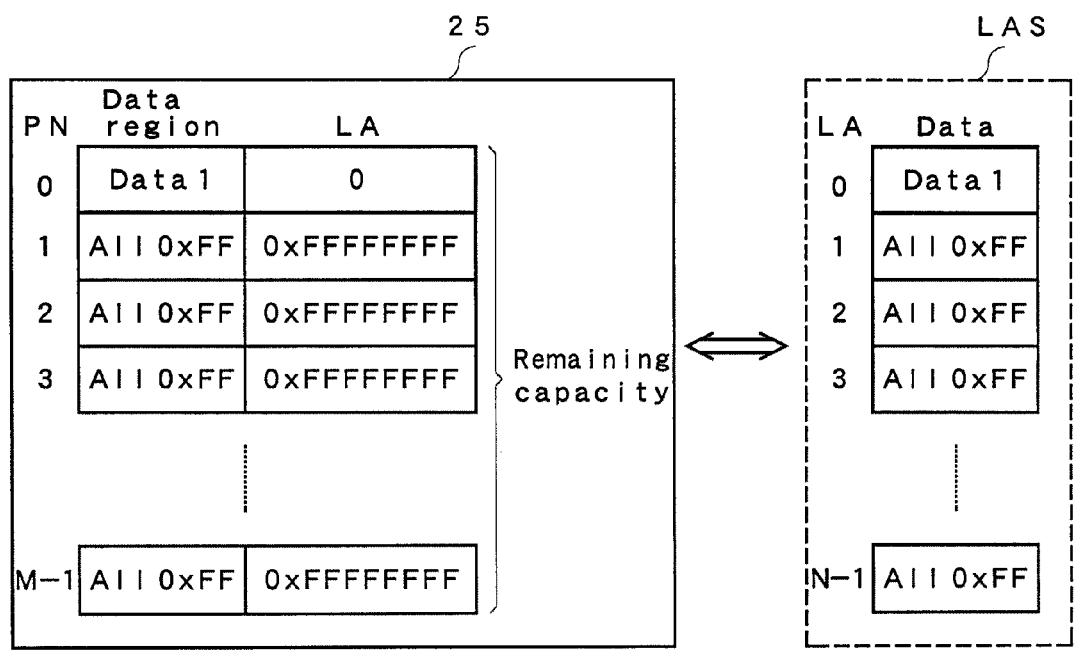
FIG. 12 is an explanation view showing a state (2) of the write once memory in embodiment 1 of the present invention.

Next, in a case where the access device 1 records data of 1 page to a region of logical address 0, the write once memory 25 changes to the state of FIG. 12. In embodiment 1, data is recorded to the write once memory 25 in ascending order from a starting position in all physical addresses. As shown in FIG. 12, the memory access part 29 records data (Data 1) to a page (PN 0) of physical address 0 and sets a logical address corresponding to the page to 0 (accurately 0x00000000) in the redundant region. Thus, when the access device 1 reads data stored in the logical address 0 from the write once recording device 2A, Data 1 stored in the page (PN 0) of physical address 0 is read.

Figure 13:
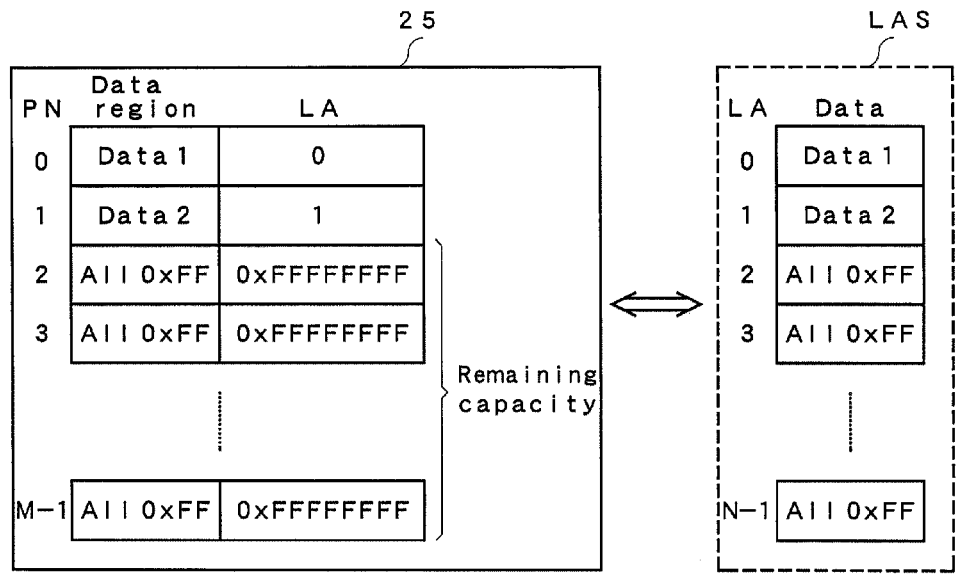
FIG. 13 is an explanation view showing a state (3) of the write once memory in embodiment 1 of the present invention.

In the similar manner, when the access device 1 records data of 1 page (Data 2) to logical address 1 (accurately 0x00000001), the state changes to a state of FIG. 13. In FIG. 13, Data 2 is stored in a page (PN 1) of physical address 1, and a logical address corresponding to the page is set to "1". Thus, when the access device 1 reads data stored in logical address 1 from the write once recording device 2A, Data 2 stored in the page (PN 1) of physical address 1 is read.

Figure 14:
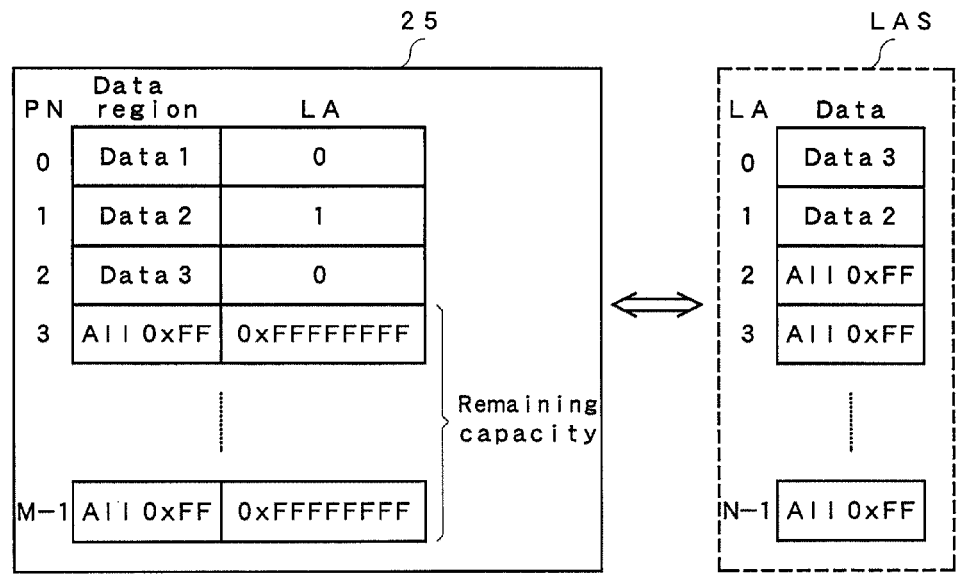
FIG. 14 is an explanation view showing a state (4) of the write once memory in embodiment 1 of the present invention.

Next, when the access device 1 records data of 1 page to the region of logical address 0, the state changes to a state of FIG. 14. In FIG. 14, data (Data 3) is stored in a page of physical address 2, and a logical address corresponding to the page is set to "0". In FIG. 14, since data was already recorded to the region of logical address 0 here, the value "0" appears in two regions for storing information of a logical address in the write once memory 25. Since data is recorded to the write once memory 25 in ascending order from a starting position in physical addresses, data stored in a region of the biggest-numbered physical address is valid in a case where data of the same logical address are stored in a plurality of portions. Accordingly, in the state of FIG. 14, when the access device 1 reads data stored in logical address 0 from the write once recording device 2A, Data 3 stored in a page (PN 2) of physical address 2 is read. In this manner, the pseudo overwriting to the write once memory is realized in embodiment 1 of the present invention.

In addition, when the initial value 0xFFFFFFFF is set to the region for storing information of a logical address in the write once memory 25, the physical empty capacity management part 27 in the write once recording device 2A judges the page to be a recordable page. For this reason, a remaining recordable capacity in the write once memory 25 can be calculated by counting the number of pages where the value 0xFFFFFFFF is set to the region for storing information of a logical address. In particular, in the case of recording data to the write once memory 25 in ascending order from a starting position in physical addresses, the write once memory 25 sequentially records data from the starting position in physical addresses to be consumed. Thus, the first page of the physical address where the value 0xFFFFFFFF is set to the region for storing information of a logical address or later are all recordable pages. Accordingly, a remaining capacity can be easily calculated by subtracting a page number found here from the total number of pages.

As described above, in the access device 1 and the write once recording device 2A in embodiment 1 of the present invention, the access device 1 obtains information related to a remaining capacity managed by the write once recording device 2A from the write once recording device 2A and knows an actually-remaining recordable capacity by comparing the obtained information with a remaining capacity on the FATs (104 and 105). Accordingly, it is possible to know an accurate remaining capacity in the case of carrying out the pseudo overwriting to the write once memory 25.

Modified Example 1

The present invention has been explained based on embodiment 1, however, it is apparent that the present invention is not restricted to embodiment 1. The embodiment can be modified within the scope of the invention. In embodiment 1 of the present invention, the case where the access device 1 obtains information related to a remaining capacity managed by the write once recording device 2A on the basis of the remaining capacity obtaining command has been explained as an example, however, other method may be employed.

Figure 15A:
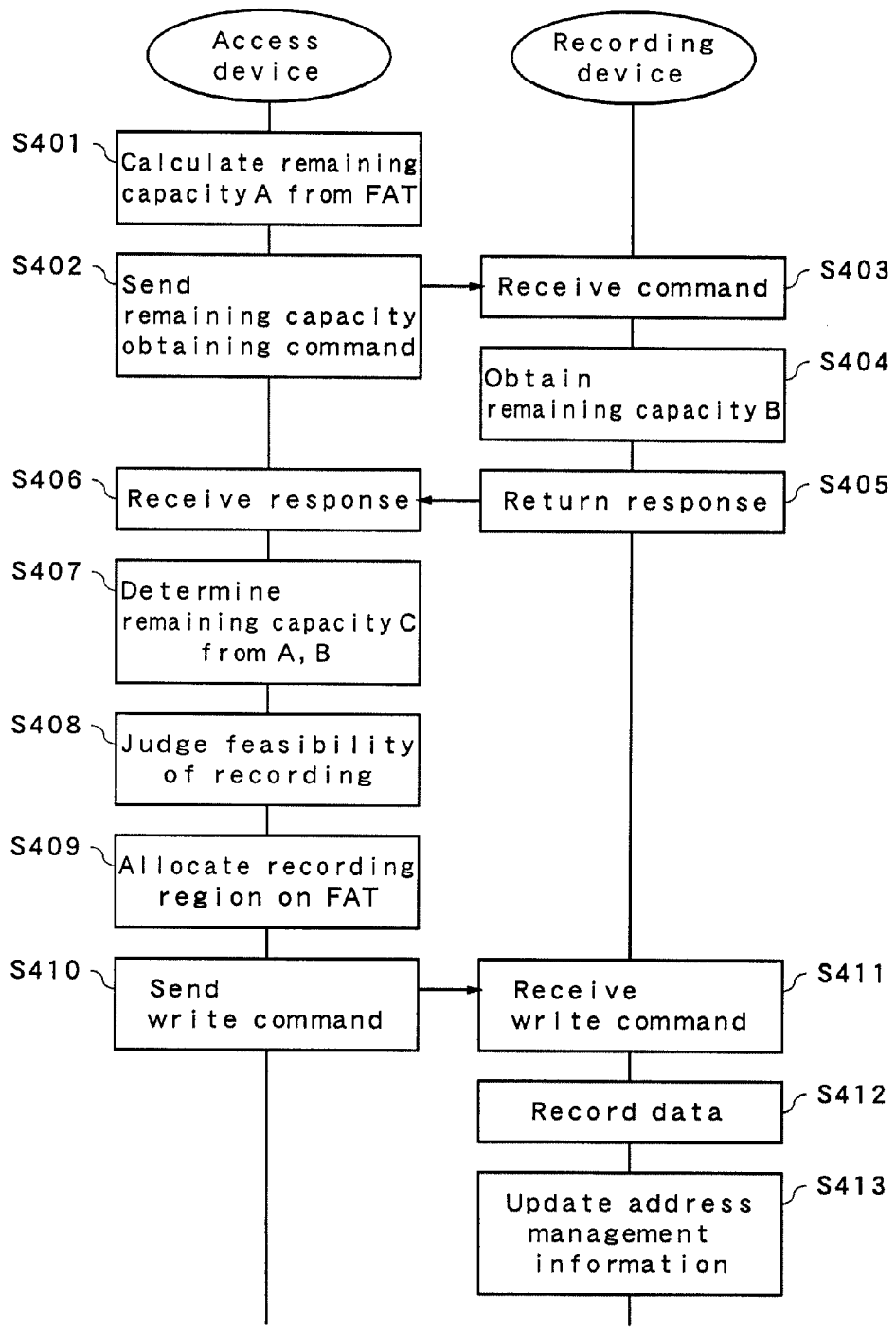
FIG. 15A is a flowchart showing modified example 1 of the file data writing process to the write once recording device in embodiment 1 of the present invention.
Figure 15B:
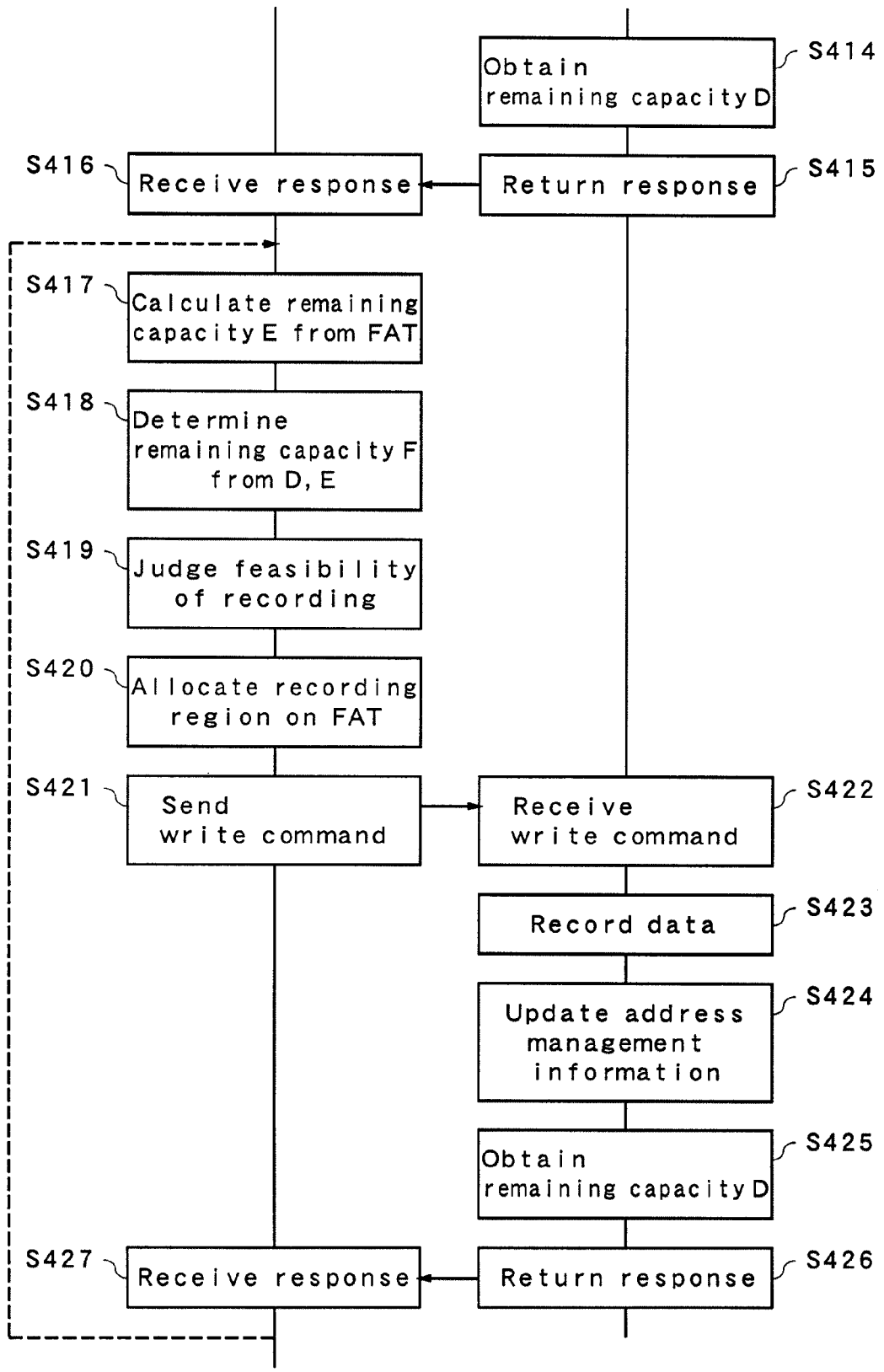
FIG. 15B is a flowchart showing modified example 1 of the file data writing process to the write once recording device in embodiment 1 of the present invention.

FIG. 15A and FIG. 15B are flowcharts showing modified example 1. In FIG. 15A, steps S401 to S413 are the same as S301 to S313 shown in FIG. 8. A remaining capacity D retained by the physical empty capacity management part 27 is obtained at S414 after recording data and updating the address management information at S412 and S413, and a response notifying completion of the recording is sent with information of the remaining capacity D. The access device receives this information and completes the process if further recording is not required. In a case where data to be recorded remains, a remaining capacity E on the logical address space is calculated based on the FAT at S417. Then, a smaller capacity, the capacity D or E, is determined as a remaining capacity F in the same manner as S409, and it is determined on the basis of the capacity whether or not the recording is possible. When the recording is impossible, the process completes, and when the recording is possible, a recording region is allocated on the FAT at S420 and a write command for file data is sent at S421. Upon reception of the command, the write once recording device 2A records data and updates the address management information (S422 to S424). Then, the write once recording device 2A newly obtains the remaining capacity D (S425), and sends a response notifying completion of the recording with information of the remaining capacity D (S426). The access device 1 receives the response (S427). And, the same processes are repeated returning to S417 as needed.

As described above, in modified example 1, information of a remaining capacity of notified to the access device 1 in addition to the response notifying completion of writing related to a write command. This eliminates necessity of obtaining a remaining capacity by issuing the remaining capacity obtaining command in next file data recording to enable the high-speed file data recording. However, as shown in FIG. 15A, it is required to obtain a remaining capacity by issuing the remaining capacity obtaining command in a first file data recording.

In this case, after the memory access part 29 carried out the data writing process to the write once memory by accepting a writing command issued by the access device, the physical empty capacity management part 27 has a function for calculating a size of an unrecorded region in the write once memory on the basis of the address management information and notifying the access device of the size as a remaining capacity physically-recordable by the access device.

Modified Example 2

Figure 3:
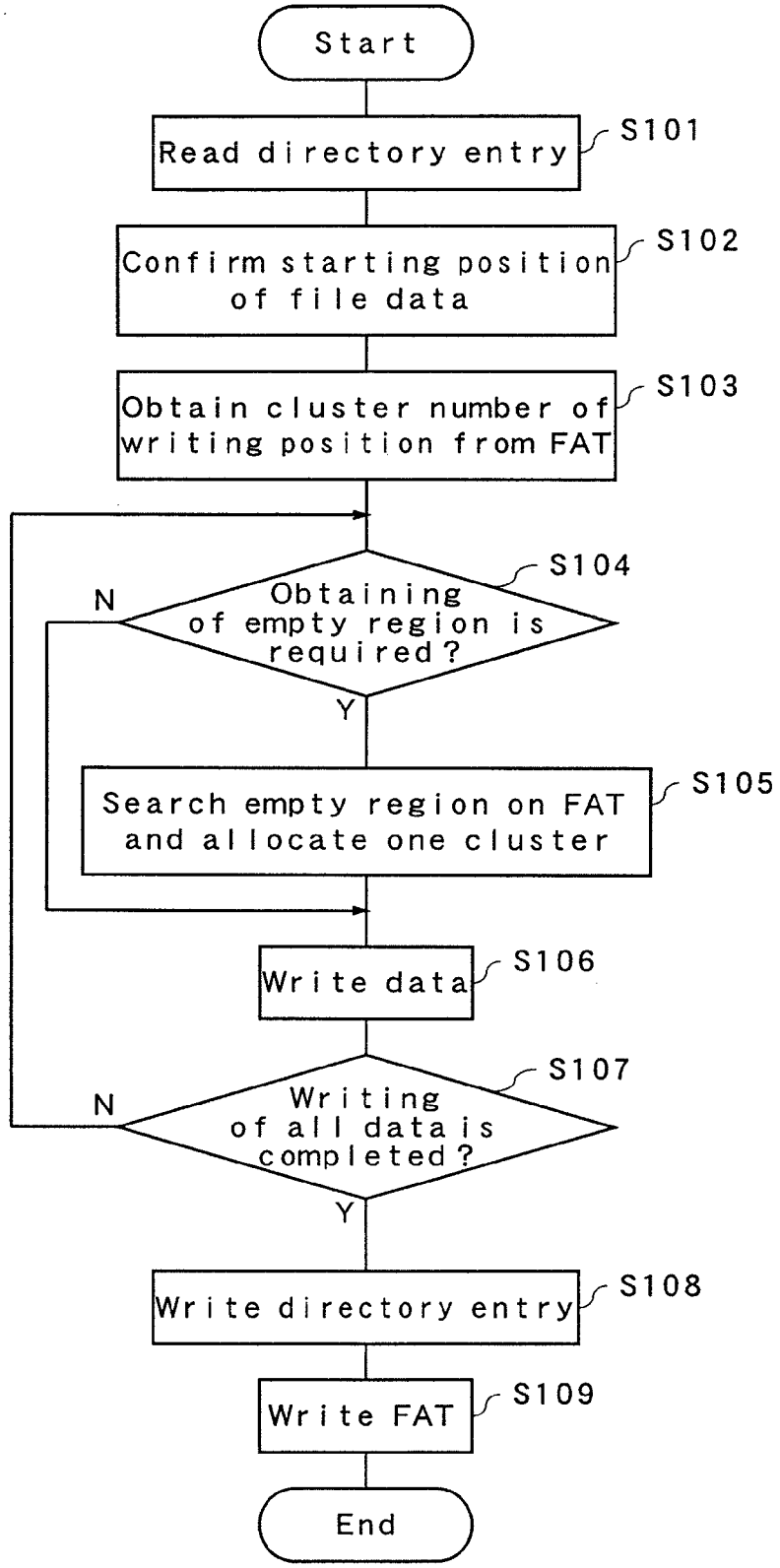
FIG. 3 is a flowchart showing a file data writing process of the FAT file system.
Figure 4:
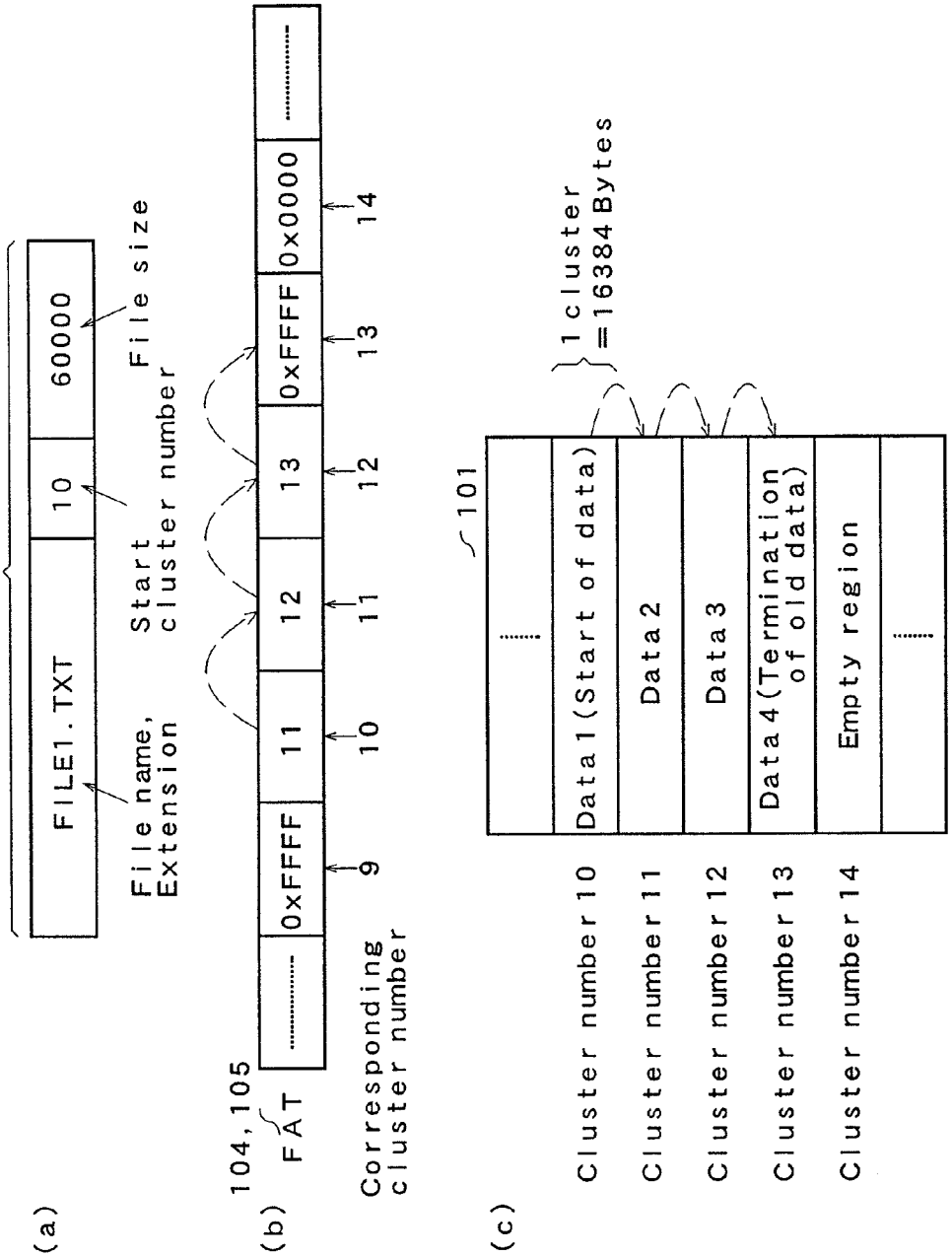
FIG. 4 is an explanation view showing a state of the FAT file system before file data writing.
Figure 5:
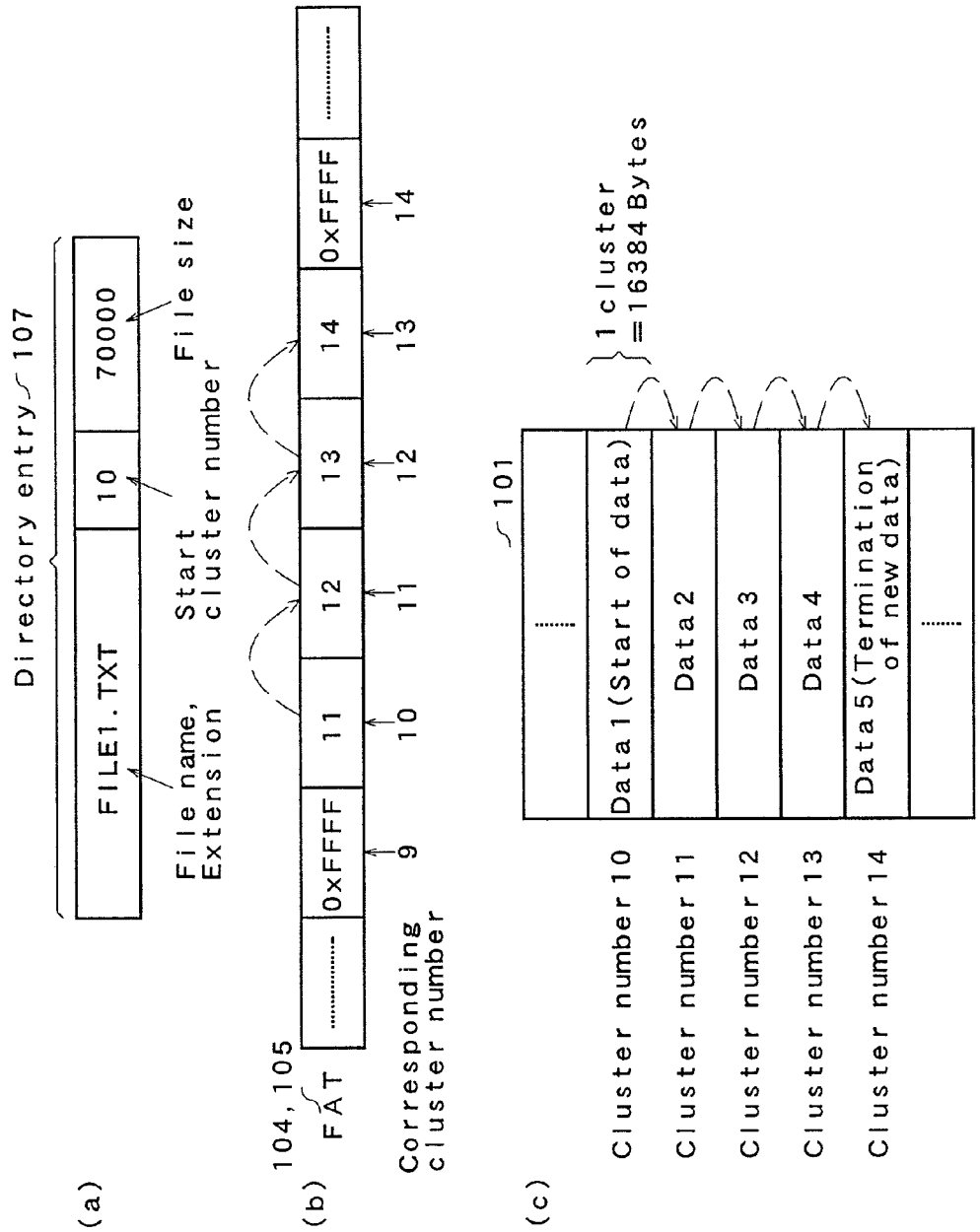
FIG. 5 is an explanation view showing a state of the FAT file system after file data writing.
Figure 6:
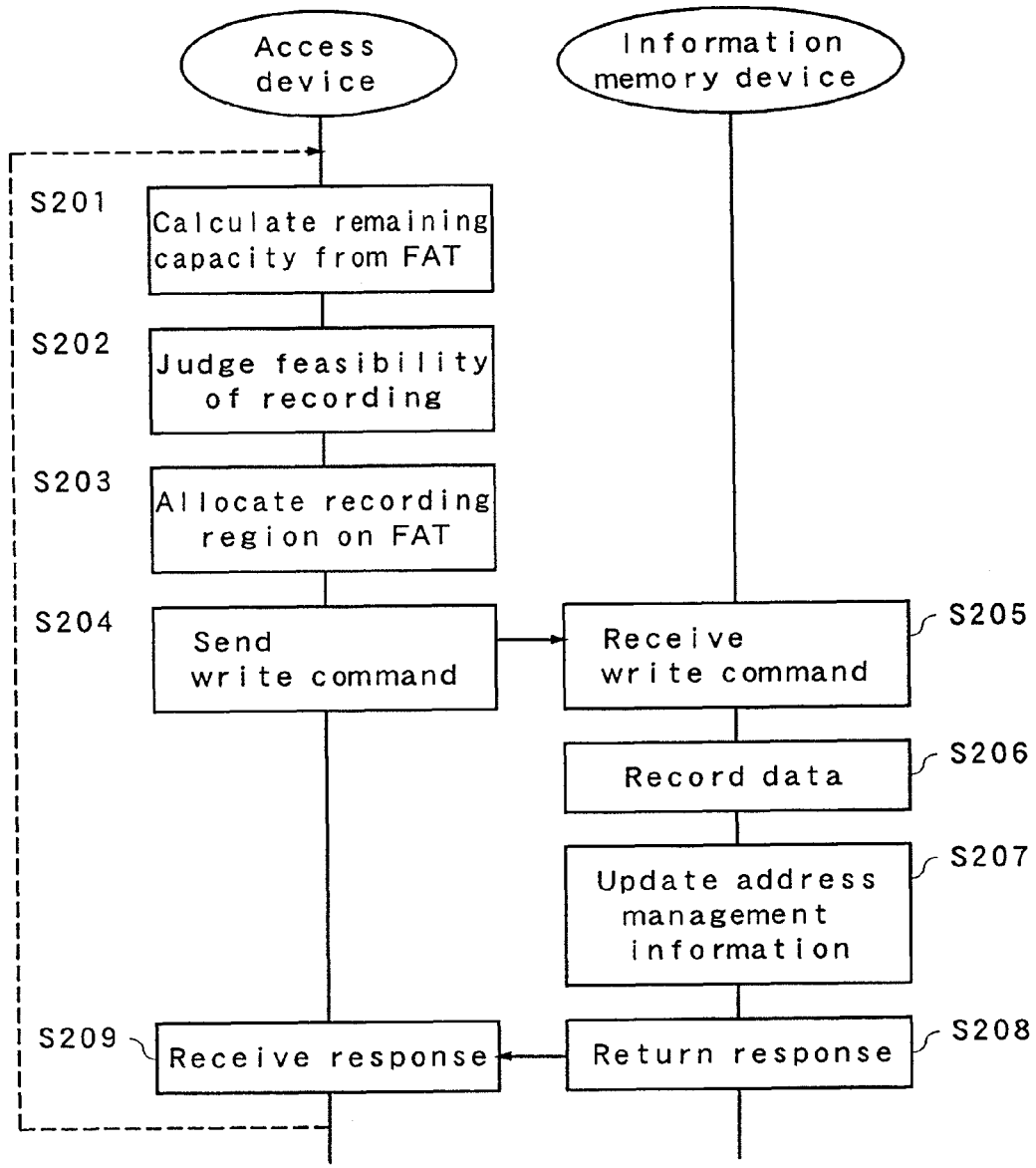
FIG. 6 is a flowchart showing a conventional file data writing process to an information recording device that can rewrite data more than once.

Next, modified example 2 of the embodiment will be explained. In this embodiment, the access device 1 notifies the write once recording device 2A of information of an address and size of a region to be recorded now before actually issuing the write command, and obtains information showing how the remaining capacity is changed by the recording. In flowcharts of FIG. 16A and FIG. 16B, the recording feasibility judgment is carried out at S501 and S502 on the basis of the remaining capacity calculated from the FATs (104 and 105). This is the same as the conventional processing procedure shown in FIG. 6. However, continued processing after that is different from that of the conventional processing procedure. As shown in FIG. 3, when recording file data, the file system requires recording the directory entry 107 and the FATs (104 and 105) with the recording of file data. For this reason, an address and size in the recording process carried out in a series of process of the file system are determined at S503. Specifically, the access device 1 records file data, and determines an address and size in the recording process related to recording of the directory entry 107 and the FATs (104 and 105) required with the file data recording. Then, the access device 1 issues a command for obtaining information indicating change of a remaining capacity by using the address and size as arguments (hereinafter referred to as a change information command) to the write once recording device 2A at S504. In this case, the logical-physical empty capacity management part 16 achieves a function for, prior to data recording to the write once recording device, issuing the change information command related to change of a remaining capacity after designating an address and size related to a recording process and obtaining a physically-remaining recordable capacity in the write once recording device.

Upon reception of this command at S505, the write once recording device 2A calculates information indicating change of a remaining capacity caused when a write command of a designated address and size is issued (S506). For example, this information is a combination of a present remaining capacity and a remaining capacity reduced on the basis of the recording address of a designated address and size. The write once recording device sends a response including this change information to the access device (S507). The access device 1 receives this response at S508. The access device 1 can preliminarily know how the remaining capacity changes in a series of processes of the file system by repeatedly executing the change information command to all of the recording processes caused in the preliminarily determined series of processes of the file system.

Subsequently, at S509 shown in FIG. 16B, recording feasibility is judged on the basis of the remaining capacity change information. When the recording is impossible, the process completes, and when the recording is possible, a recording region is allocated on the FAT at S510 and a write command is sent at S511. Upon reception of this command at S512, the write once recording device 2A records data and updates the address management information, proceeding to S513 and S514. Then, the recording device returns a recording completion response to the access device (S515). The access device 1 receives this response. And, the processes S511 to S515 are repeated until a series of necessary data recording completes.

In a case where consistency of a file system is maintained only when all of file data, the directory entry 107, and the FATs (104 and 105) have been recorded, it can be avoided by employing this method that consistency of the file system cannot be maintained because a remaining capacity is completely consumed at a point where up to file data and the directory entry 107 have been recorded and the FAT (104 and 150) cannot be recorded.

In accepting the change information command issued by the access device prior to data recording, the physical empty capacity management part 27 knows information related to change of a remaining recordable capacity in the write once memory before and after carrying out a recording process designated by the access device on the basis of: the address management information; and information of an address and size related to the recording process designated with a command by the access device, and notifies the access device of the information.

Figure 16B:
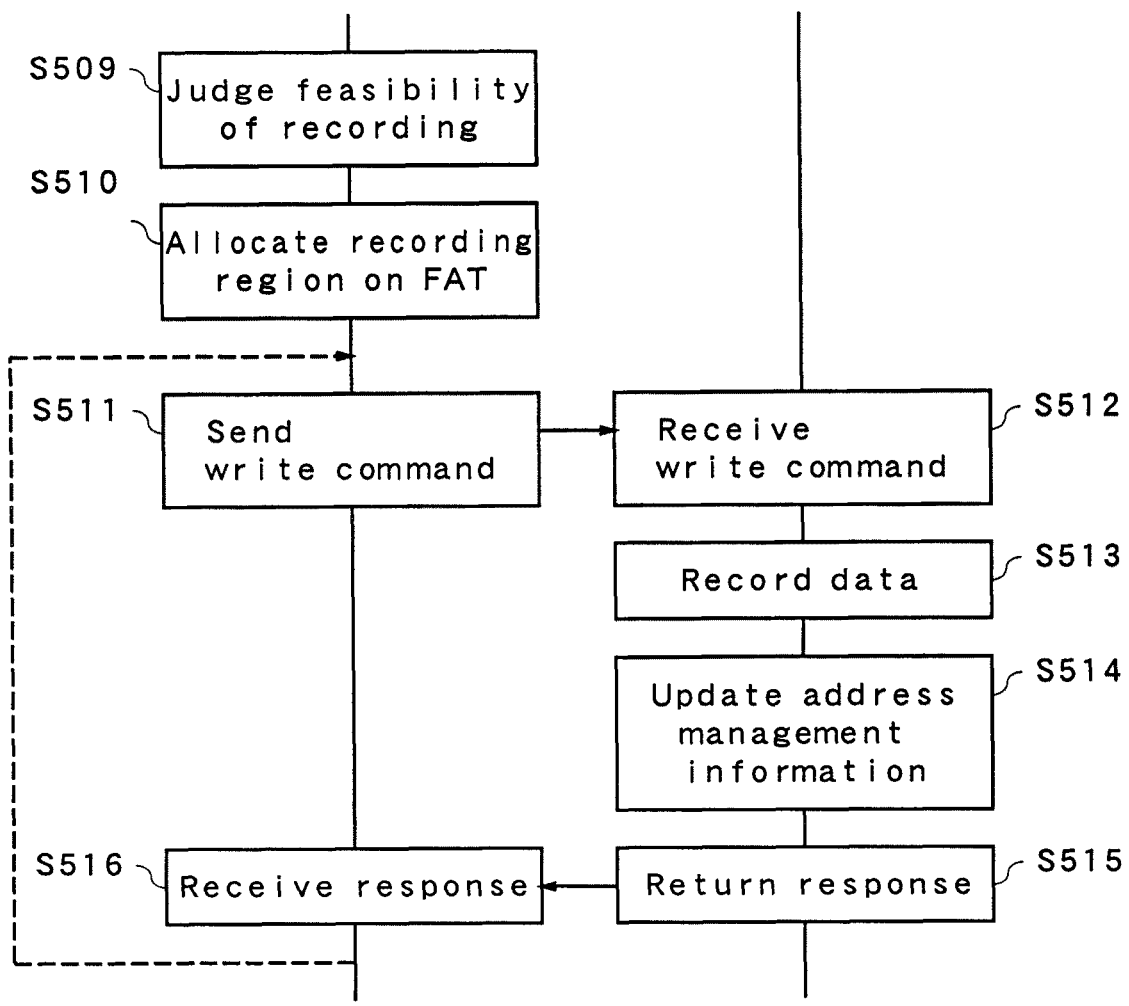
FIG. 16B is a flowchart showing modified example 2 of the file data writing process to the write once recording device in embodiment 1 of the present invention.

In addition, the case where the change information command is repeated in the required number of times has been explained as an example in the flowcharts of FIG. 16A and FIG. 16B, however, the information related to the change of remaining capacity corresponding to the write commands for plural number of times may be obtained by a single command.

In addition, the configuration of the address management information explained in embodiment 1 of the present invention is one example, and the information may employ another configuration. The management unit is a page unit having a size of 2 kB here, however, a different size may be employed as the management unit. For example, the case of using a region of 4 bytes per page as a region for storing a logical address has been described as an example, however, a region of 16 bytes may be used per page. In this manner, the address conversion can be carried out in sector units (in units of 512 bytes) shown in FIG. 8, and the sector unit can be employed as the management unit. On the contrary, the management unit may be configured by aggregating a plurality of pages, and the address conversion may be carried out in this units. In addition, the case where the address management information is dispersed and stored in the redundant regions in the write once memory 25 has been explained as an example, however, the information may be aggregated and stored in one portion.

Embodiment 2

Figure 17:
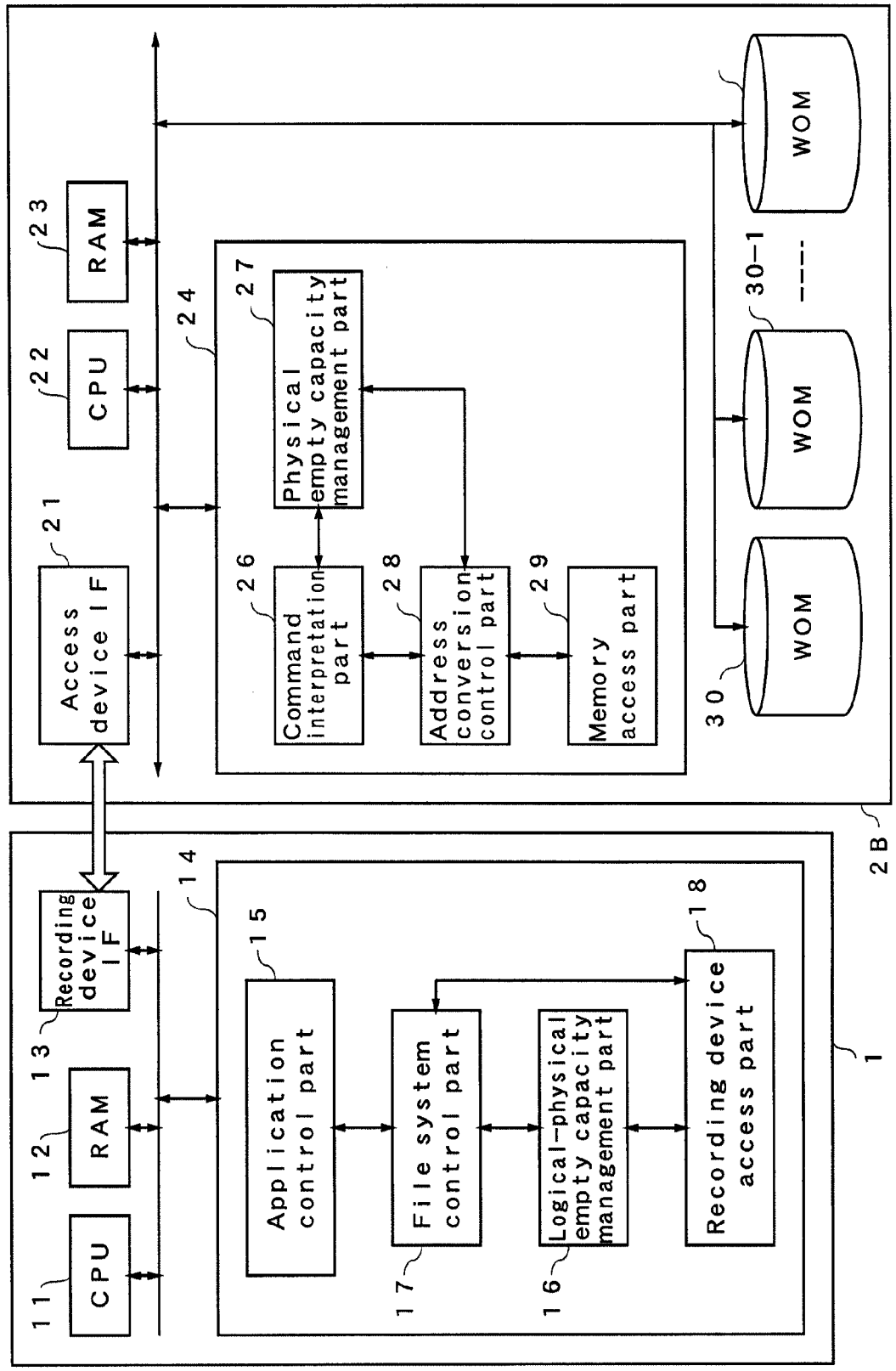
FIG. 17 is an explanation view showing an access device and a write once recording device in embodiment 2 of the present invention.

FIG. 17 is a configuration view of an access device and a write once recording device in embodiment 2 of the present invention. In the embodiment, a write once recording device 2B has P (P is a natural number) write once memories. In the respective write once memories 30-1, 30-2, to 30-P, there is a logical address space storing file system management information and user data same as in FIG. 7 and the address management information is also stored in order to realize the pseudo overwriting to the write once memory.

Figure 18:
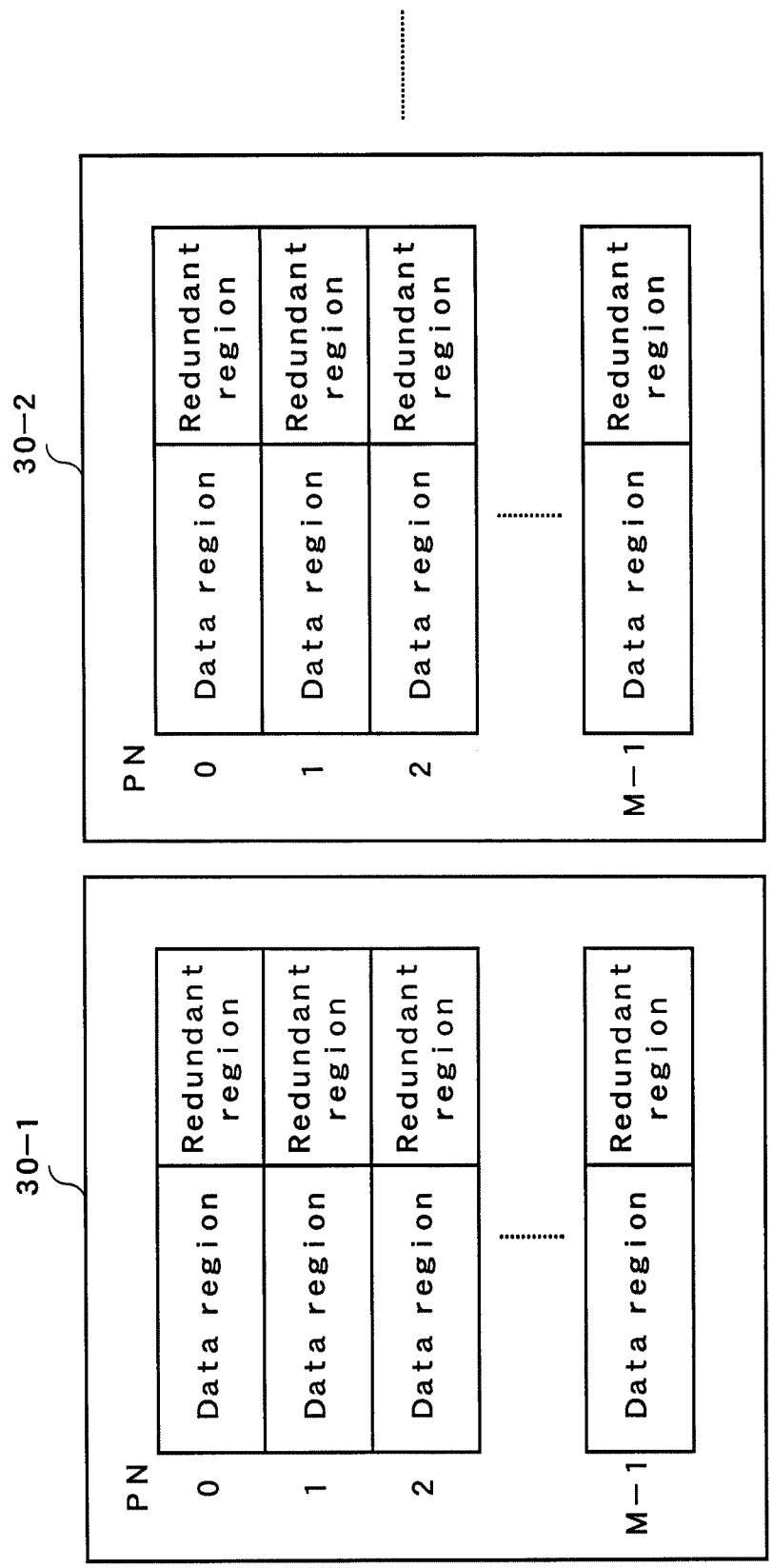
FIG. 18 is an explanation view showing a configuration of a write once memory in embodiment 2 of the present invention.

FIG. 18 is a view showing a configuration of the write once memory in embodiment 2 of the present invention. Memory numbers 1, 2, to P are allocated to the respective write once memories as an identifier. A region in each write once memory includes a plurality of pages composed of the data region and the redundant region same as in FIG. 8. Accordingly, a unique physical address is determined by combining a memory number and a page number. In addition, each write once memory is managed by being allocated to a specific logical address. For example, the write once memory 30-1 of the memory number 1 is allocated to a logical address space of logical addresses 0 to (N−1), and the write once memory 30-2 of the memory number 2 is allocated to a logical address space of logical addresses N to (2N−1). By allocating each write once memory to a specific logical address space in this manner, an address space for an address conversion becomes small, resulting in merit of being able to keep an overhead of the address conversion process low.

Next, referring to FIG. 19A and FIG. 19B, a procedure of file data writing process to the write once recording device 2B in embodiment 2 of the present invention will be explained.

(S601) The access device 1 calculate a remaining capacity A on the basis of information of the FATs (104 and 105) read from the write once recording device 2B into the RAM 12 on the access device 1. On this occasion, a logical address space allocated to each write once memory is specified, and only a region included in the logical address space corresponding to a piece of the write once memory is treated as a calculation object.

(S602) The access device 1 issues the remaining capacity obtaining command to the write once recording device 2B. This command designates the memory number i corresponding to the logical address specified as an argument at S601 and demands information of a remaining capacity of the write once memory 30-$i$.

(S603) and (S604) In the write once recording device 2B that received the remaining capacity obtaining command issued from the access device 1 at S602, the command interpretation part 26 identifies a type of the command and a remaining capacity B is obtained from the physical empty capacity management part 27.

(S605) As a response to the remaining capacity obtaining command, the write once recording device 2B returns information of the remaining capacity B included in the specified write once memory, with a response notifying completion of a remaining capacity obtaining process, to the access device 1.

(S606) and (S607) The access device 1 receives this response, and determines a smaller value, the remaining capacity A calculated at S601 or the remaining capacity B obtained at S604, as an actually-remaining recordable capacity $C_i$ of the write once memory of the memory number $i$. The processes from S601 to S607 are repeatedly carried out to all write once memories included in the write once recording device 2A.

(S608) After that, the access device 1 calculates a remaining capacity D of the write once recording device 2A from a summation of $C_i$ ($i=1$ to P) of the respective write once memories.

(S609) The access device 1 judges on the basis of the remaining capacity D determined at S608 whether the file data recording is possible or not. The access device 1 finishes the processing if impossible.

(S610) In the case where the recording has been judged to be possible at S609, search an empty region of a size of data written in a single file data writing on the FATs (104 and 105) and allocate a recording region on the FATs (104 and 105) by setting the FAT entry to a value other than "0" on the RAM 12. On this occasion, since the remaining capacities of the write once memories are different from each other, an empty region is searched on the FATs (104 and 105) only in the logical address space corresponding to the write once memory having a remaining capacity. Specifically, that can be realized by storing the memory number $i$ of the write once memory whose remaining capacity $C_i$ has been 0 at the process S607 and removing the corresponding logical address space from objects for the searching of empty region on the FATS (104 and 105).

(S611) The access device 1 issues a write command to the write once recording device 2B to record file data to the recording region allocated at S610.

(S612) and (S613) The write once recording device 2B receives the write command issued from the access device 1, searches a recordable region on the write once memory, and records the file data.

(S614) The write once recording device 2B updates the address management information to correspond the physical address of the region where the file data has been recorded at S613 to the logical address designated from the access device 1.

(S615) and (S616) As a response to the write command, the write once recording device 2A returns a recording completion response notifying completion of the recording to the access device 1. The access device receives the response, and repeats the same processes returning to S601 as needed.

In this manner, while there is file data to be recorded, processes from S601 to S216 are repeatedly carried out.

As described above, in the file data recording in embodiment 2 of the present invention, the access device 1 issues the remaining capacity obtaining command to the write once recording device 2B for each of a plurality of the write once memories, and after obtaining the physically-remaining recordable capacity, knows an actually-remaining recordable capacity by comparing the physically-remaining recordable capacity with a remaining capacity on the FAT. In this manner, an accurate remaining capacity can be known even in a case where the write once recording device 2B has a plurality of write once memories.

The present invention has been explained based on embodiment 2, however, it is apparent that the present invention is not restricted to the explanation described here. The embodiment can be modified within the scope of the invention. Various types of modifications described in embodiment 1 of the present invention may be applied to embodiment 2.

Figure 19A:
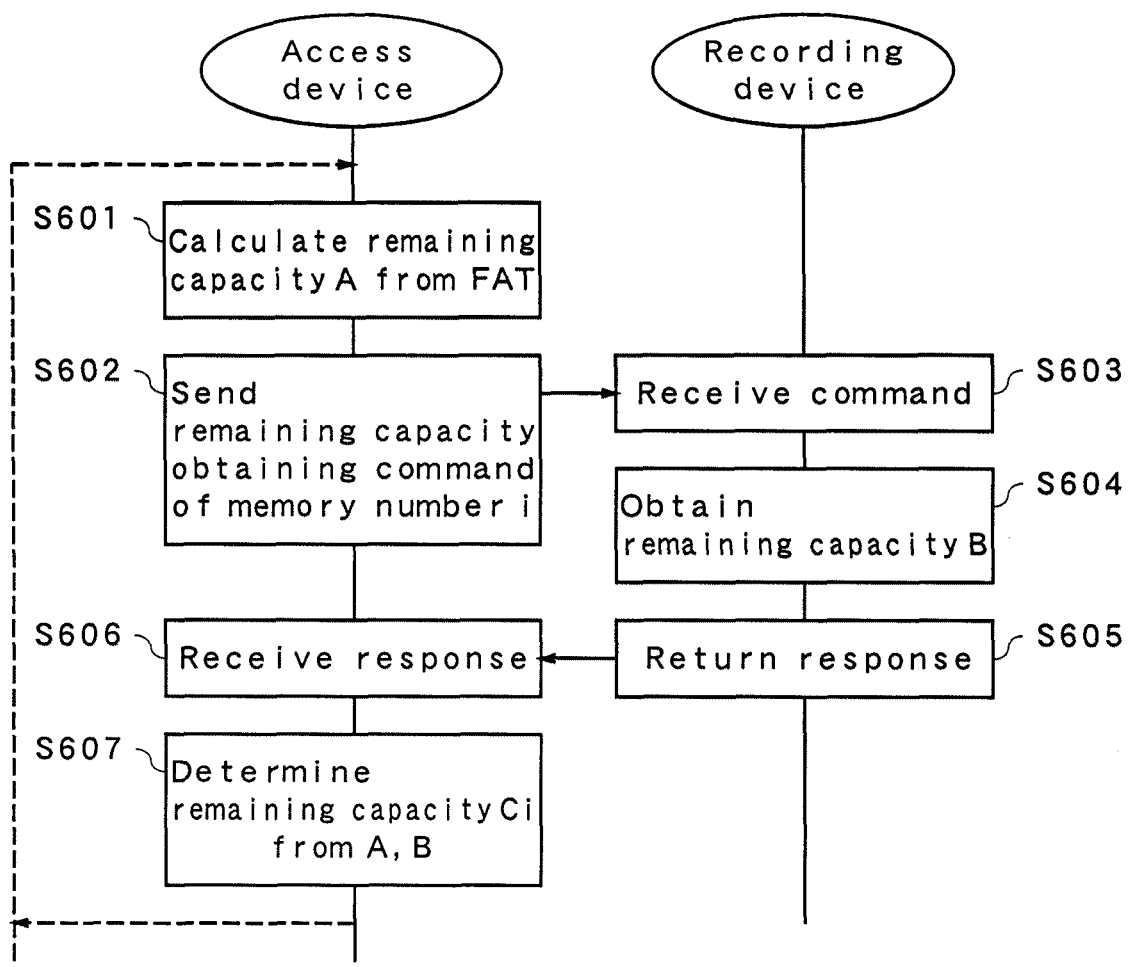
FIG. 19A is a flowchart showing a file data writing process to the write once recording device in embodiment 2 of the present invention.

In addition, in the process at S607 of the flow in FIG. 19A, the remaining capacity C of any one of the write once memories including a logical address space including the FATs (104 and 105) may be consistently set to 0. In this manner, a specific write once memory can be used for recording of the FAT, and file data is not written to the write once memory. As the result, the write once memory consumes an empty region only in a pseudo overwriting process of the FAT, the number of times of overwriting the FAT can be extended.

Moreover, the present invention may be applied to a case of managing a piece of the write once memory by dividing the memory into a plurality of regions and by allocating each of the regions to a specific logical region.

In the access device and the write once recording device according to the present invention, the access device obtains information related to a remaining capacity managed by the write once recording device from the write once recording device, and knows an actual-remaining recordable capacity by comparing the information with a remaining capacity on the FAT. In this manner, an accurate remaining capacity can be known in the case of carrying out the pseudo overwriting to the write once memory, and a following problem can be avoided; file data is recorded even though the write once memory does not have an empty region.

INDUSTRIAL APPLICABILITY

The above-mentioned write once memory device can be used as a recording medium for storing digital contents such as a piece of music, a still image, and a motion picture, and the access device can be used as, for example, a PC application, an audio recorder, a DVD recorder, a HDD recorder, a movie camera, a digital still camera, and a mobile phone terminal accessing the write once recording device.

The invention claimed is:

1. An access device that accesses a write once recording device having a write once memory allowing data writing only once, the access device comprising:
a file system controller configured to control data as a file on the basis of file system information in a recording region of the write once recording device; and
a logical-physical empty capacity manager configured to issue a command to the write once recording device to obtain a physical remaining capacity of the write once recording device, and to determine an available recording capacity of the write once recording device based on selectively using the physical remaining capacity obtained in response to the command or a remaining capacity obtained from the file system information as the available recording capacity,
wherein a rate of decrease in the physical remaining capacity differs from a rate of decrease in the remaining capacity obtained from the file system information, as data writing is performed and the file system information is replaced by the file system controller.

2. The access device according to claim 1, wherein the logical-physical empty capacity manager compares the remaining capacity obtained from the file system information and the physical remaining capacity, and determines the available recording capacity by selecting a smaller one of the remaining capacity and the physical remaining capacity.

3. The access device according to claim 1, wherein the remaining capacity obtained from the file system information is equal to or smaller than the physical remaining capacity upon first use of the write once memory, and
the physical remaining capacity becomes smaller than the remaining capacity obtained from the file system information, as the data writing is repeatedly performed.

4. The access device according to claim 1, wherein the rate of decrease in the physical remaining capacity is greater than the rate of decrease in the remaining capacity obtained from the file system information, as the data writing is performed by the file system controller.

5. The access device according to claim 1, wherein the file system controller determines whether a data file can be stored in the write once memory based on the available recording capacity by comparing the available recording capacity and a size of the data file.

6. A write once recording system comprising:
a write once recording device having a write once memory allowing data writing only once; and
an access device configured to access the write once recording device,
wherein the write once recording device comprises:
a write once memory allowing data writing only once; and
a controller that notifies the access device of a physically-recordable size as a physical remaining capacity, and
wherein the access device comprises:
a file system controller configured to control data as a file on the basis of file system information in a recording region of the write once recording device; and
a logical-physical empty capacity manager configured to issue a command to the write once recording device to obtain the physical remaining capacity of the write once recording device, and to determine an available recording capacity of the write once recording device based on selectively using the physical remaining capacity obtained in response to the command or a remaining capacity obtained from the file system information as the available recording capacity, and
wherein a rate of decrease in the physical remaining capacity differs from a rate of decrease in the remaining capacity obtained from the file system information, as data writing is performed and the file system information is replaced by the file system controller.

7. The write once recording system according to claim 6, wherein the logical-physical empty capacity manager compares the remaining capacity obtained from the file system information and the physical remaining capacity, and determines the available recording capacity by selecting a smaller one of the remaining capacity and the physical remaining capacity.

8. The write once recording system according to claim 6, wherein the remaining capacity obtained from the file system information is equal to or smaller than the physical remaining capacity upon first use of the write once memory, and
the physical remaining capacity becomes smaller than the remaining capacity obtained from the file system information, as the data writing is repeatedly performed.

9. The write once recording system according to claim 6, wherein the rate of decrease in the physical remaining capacity is greater than the rate of decrease in the remaining capacity obtained from the file system information, as the data writing is performed by the file system controller.

10. The write once recording system according to claim 6, wherein the file system controller determines whether a data file can be stored in the write once memory based on the available recording capacity by comparing the available recording capacity and a size of the data file.

* * * * *